(12) United States Patent
Taya

(10) Patent No.: US 9,136,663 B2
(45) Date of Patent: Sep. 15, 2015

(54) FIBER-OPTIC SYSTEM AND METHOD FOR MANUFACTURING SAME

(71) Applicant: FUJIKURA LTD., Tokyo (JP)

(72) Inventor: Hiroyuki Taya, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/484,707

(22) Filed: Sep. 12, 2014

(65) Prior Publication Data

US 2015/0029580 A1    Jan. 29, 2015

Related U.S. Application Data

(63) Continuation of application No. PCT/JP2013/052022, filed on Jan. 30, 2013.

(30) Foreign Application Priority Data

Mar. 28, 2012 (JP) ................................ 2012-075098

(51) Int. Cl.
| | |
|---|---|
| *H01S 3/00* | (2006.01) |
| *H01S 3/067* | (2006.01) |
| *G02B 6/036* | (2006.01) |
| *H01S 3/04* | (2006.01) |
| *G02B 6/255* | (2006.01) |
| *H01S 3/094* | (2006.01) |
| *G02B 6/14* | (2006.01) |

(52) U.S. Cl.
CPC ............ *H01S 3/06783* (2013.01); *G02B 6/036* (2013.01); *G02B 6/03633* (2013.01); *G02B 6/03638* (2013.01); *H01S 3/0405* (2013.01); *H01S 3/06754* (2013.01); *G02B 6/14* (2013.01); *G02B 6/2551* (2013.01); *H01S 3/06704* (2013.01); *H01S 3/06733* (2013.01); *H01S 3/06758* (2013.01); *H01S 3/094003* (2013.01); *H01S 3/094042* (2013.01)

(58) Field of Classification Search
CPC ........ H01S 3/06733; G02B 6/036; G02B 6/26
USPC ........................................................ 359/341.1
See application file for complete search history.

(56) References Cited

U.S. PATENT DOCUMENTS

| 7,748,913 B2 * | 7/2010 | Oba .............................. 385/96 |
| 7,835,608 B2 * | 11/2010 | Minelly et al. ................ 385/126 |
| 2007/0230884 A1 | 10/2007 | Minelly et al. |

(Continued)

FOREIGN PATENT DOCUMENTS

| JP | 2004-252057 A | 9/2004 |
| JP | 2007-271786 A | 10/2007 |

(Continued)

OTHER PUBLICATIONS

International Search Report mailed Apr. 2, 2013 in corresponding PCT/JP2013/052022.

(Continued)

*Primary Examiner* — Mark Hellner
(74) *Attorney, Agent, or Firm* — Westerman, Hattori, Daniels & Adrian, LLP

(57) ABSTRACT

In a fiber amplifier including a third optical fiber made of a double clad fiber for amplifying light and a fifth optical fiber made of a single clad fiber for transmitting the light amplified by the double clad fiber, a fourth optical fiber made of a triple clad fiber is inserted between the third optical fiber and the fifth optical fiber.

7 Claims, 15 Drawing Sheets

(56) References Cited

U.S. PATENT DOCUMENTS

| | | |
|---|---|---|
| 2008/0239471 A1 | 10/2008 | Tamaoki |
| 2009/0074362 A1 | 3/2009 | Oba |
| 2010/0188735 A1 | 7/2010 | Tamaoki |
| 2011/0075252 A1 | 3/2011 | Frith |
| 2011/0149383 A1 | 6/2011 | Kashiwagi et al. |

FOREIGN PATENT DOCUMENTS

| | | | |
|---|---|---|---|
| JP | 2008-251694 A | 10/2008 | |
| JP | 2008-268747 A | 11/2008 | |
| JP | 2008-310277 A | 12/2008 | |
| JP | 2010-056265 A | 3/2010 | |

OTHER PUBLICATIONS

Extended European Search Report dated May 26, 2015, issued in corresponding European Patent Application No. 13767342.2 (7 pages).

Notification of Reasons for Refusal dated Jun. 2, 2015, issued in corresponding Japanese Patent Application No. 2014-507473 with English translation (5 pages).

* cited by examiner

F I G. 7
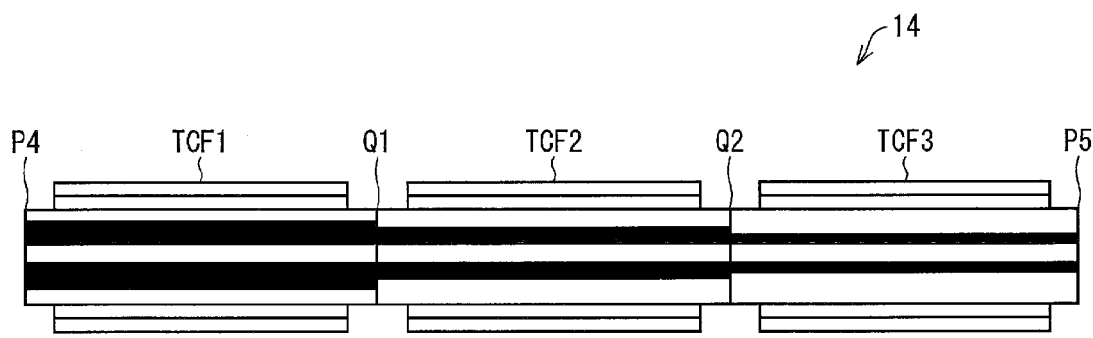

F I G. 1 4
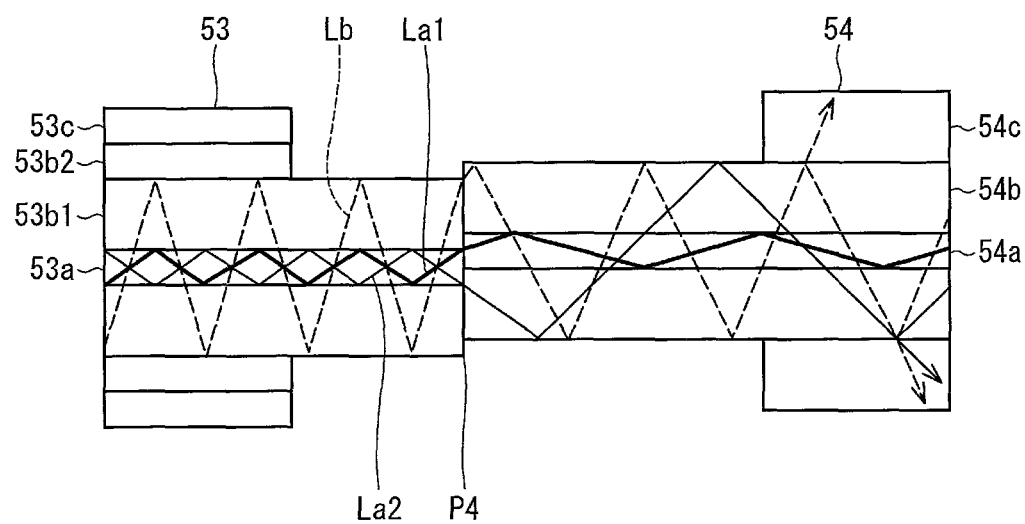

F I G. 1 5
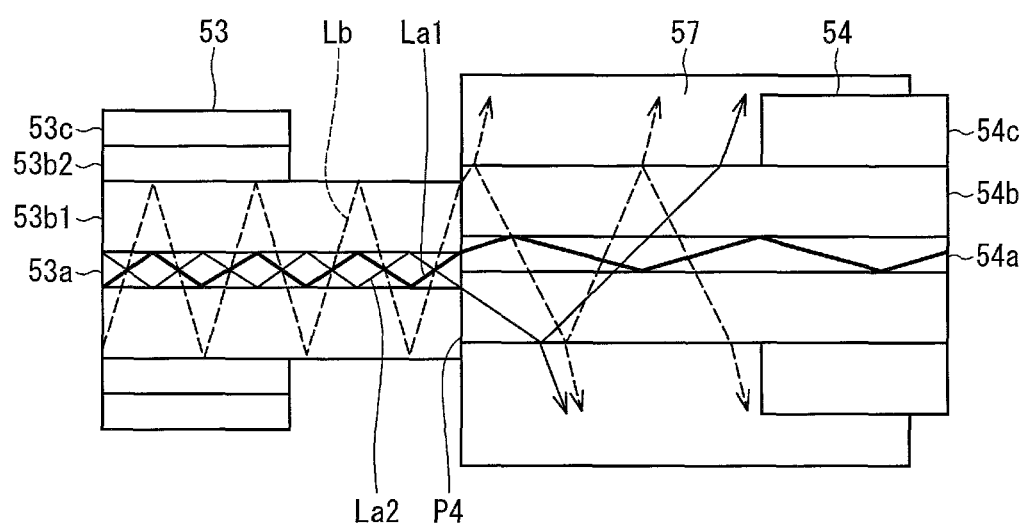

FIBER-OPTIC SYSTEM AND METHOD FOR MANUFACTURING SAME

CROSS-REFERENCE TO RELATED APPLICATIONS

This application is a Continuation of PCT International Application No. PCT/JP2013/052022 filed in Japan on Jan. 30, 2013, which claims the benefit of Patent Application No. 2012-075098 filed in Japan on Mar. 28, 2012, the entire contents of which are hereby incorporated by reference.

TECHNICAL FIELD

The present invention relates to a fiber-optic system, such as a fiber amplifier or a fiber laser, which includes an amplification double clad fiber and a transmission single clad fiber. The present invention also relates to a method for producing the fiber-optic system.

BACKGROUND ART

There has been wide use of a fiber-optic system that includes a double clad fiber (hereinafter, also referred to as an "amplification double clad fiber") that amplifies signal light and a single clad fiber (hereinafter, also referred to as a "transmission single clad fiber") that transmits the signal light amplified by the double clad fiber. Typical examples of such a fiber-optic system are a fiber amplifier and a fiber laser.

FIG. 13 is a block diagram illustrating a configuration of a typical conventional fiber amplifier 5. As illustrated in FIG. 13, the fiber amplifier 5 is a fiber-optic system including a plurality of optical fibers. In the following description, the optical fibers constituting the fiber amplifier 5 are divided into four segments. These four segments are referred to as a first optical fiber 51, a second optical fiber 52, a third optical fiber 53, and a fourth optical fiber 54, respectively. Moreover, a fusion splice point between the first optical fiber 51 and the second optical fiber 52 is referred to as P2 and a fusion splice point between the second optical fiber 52 and the third optical fiber 53 is referred to as P3. Further, a fusion splice point between the third optical fiber 53 and the fourth optical fiber 54 is referred to as P4.

The first optical fiber 51 is an optical fiber for taking in signal light and made of a single clad fiber. The first optical fiber 51 has an incident end P1 to which a signal light source (not illustrated) is connected. After signal light enters the first optical fiber 51 from the signal light source via the incident end P1 and then propagates through the first optical fiber 51, the signal light enters the second optical fiber 52 via the fusion splice point P2.

The second optical fiber 52 is an optical fiber for taking in excitation light. In the second optical fiber 52, a pump combiner 56 is inserted. To this pump combiner 56, at least one (six in an example illustrated in FIG. 13) excitation light source 55 is connected. In the second optical fiber 52, a segment portion from the fusion splice point P2 to the pump combiner 56 is made of a single clad fiber and a segment portion from the pump combiner 56 to the fusion splice point P3 is made of a double clad fiber. After the signal light having entered a core of the second optical fiber 52 from the first optical fiber 51 via the fusion splice point P2 propagates through the second optical fiber 52, the signal light enters the third optical fiber 53 via the fusion splice point P3. Meanwhile, after excitation light enters a first clad of the second optical fiber 52 from the excitation light source 55 via the pump combiner 56 and then propagates through the second optical fiber 52, the excitation light enters the third optical fiber 53 via the fusion splice point P3.

The third optical fiber 53 is an optical fiber for amplifying the signal light and made of a double clad fiber. In other words, the third optical fiber 53 is an amplification double clad fiber. The third optical fiber 53 has a cross-section structure including a core 53a to which an active element such as a rare earth element is added, a first clad 53b1 surrounding the core 53a, a second clad 53b2 surrounding the first clad 53b1, a jacket 53c surrounding the second clad 53b2 (see FIG. 14). After the excitation light having entered the third optical fiber 53 from the second optical fiber 52 via the fusion splice point P3 propagates through the first clad 53b1 of the third optical fiber 53, the excitation light enters the fourth optical fiber 54 via the fusion splice point P4. The excitation light causes a transition of a state of the active element added to the core 53a to a state of population inversion. Meanwhile, after the signal light having entered the third optical fiber 53 from the second optical fiber 52 via the fusion splice point P3 propagates through the core 53a of the third optical fiber 53, the signal light enters the fourth optical fiber 54 via the fusion splice point P4. The active element added to the core 53a of the third optical fiber 53 is made to cause stimulated emission by the signal light. Because the active element is kept in the state of population inversion by the excitation light, the number of photons emitted in the stimulated emission exceeds the number of photons absorbed by the active element. In other words, the signal light having entered the third optical fiber 53 is amplified during a process in which the signal light propagates through the core 53a of the third optical fiber 53.

The fourth optical fiber 54 is an optical fiber for transmitting the amplified signal light and made of a single clad fiber. In other words, the fourth optical fiber 54 is a transmission single clad fiber. After the signal light having entered the fourth optical fiber 54 from the third optical fiber 53 via the fusion splice point P4 propagates through a core 54a of the fourth optical fiber 54, the signal light is outputted from an output end P5 of the fourth optical fiber 54.

In a case where the fourth optical fiber 54 that is made of a transmission single clad fiber is fusion sliced to the third optical fiber 53 that is made of an amplification double clad fiber as described above, the following problem occurs at the fusion splice point P4.

That is, in a case where axial misalignment occurs at the fusion splice point P4 between the third optical fiber 53 and the fourth optical fiber 54, part of signal light La1, La2 amplified by the core 53a of the third optical fiber enters a clad 54b of the fourth optical fiber 54, as illustrated in FIG. 14. Further, residual excitation light Lb, which has not been absorbed by the active element but remains, also enters the clad 54b of the fourth optical fiber 54, as illustrated in FIG. 14. The signal light La and the residual excitation light Lb that have entered the clad 54b of the fourth optical fiber 54 cause the jacket 54c to heat up, during a process in which the signal light La and the residual excitation light Lb propagates through the clad 54b of the fourth optical fiber 54. Due to this heat, the jacket 54c is degraded. In the worst case, the fourth optical fiber 54 may be broken. Particularly in a recent high-output fiber amplifier, a power of the signal light La2 propagating the clad 54b of the fourth optical fiber 54 reaches a level of tens of watts. Therefore, this problem is serious in such a recent high-output fiber amplifier.

Note that respective core diameters of the amplification double clad fiber and the transmission single clad fiber are approximately 10 μm in general. Therefore, a slight axial misalignment causes the signal light to enter the clad of the transmission single clad fiber from the core of the amplification double clad fiber. Further, in many cases, a shape of the core of the amplification double clad fiber is arranged to be polygonal so as to prevent a skew while a shape of the core of the transmission single clad fiber is arranged to be circular. In such a case, due to difference in core shape at the fusion splice point, the signal light easily enters the clad of the transmission single clad fiber from the core of the amplification double clad fiber.

Patent Literatures 1 through 4 discloses techniques for solving the above problem, respectively.

Patent Literature 1 discloses a technique for converting, into heat, residual excitation light that has just entered a single clad fiber. According to the technique, such residual excitation light is converted into heat, by (i) covering a fusion splice point between a double clad fiber and the single clad fiber with a block made of a material with a high thermal conductivity and (ii) filling, with a transparent resin, a space between this block and each of the double clad fiber and the single clad fiber. The transparent resin employed here is a resin having a refractive index that is higher than that of a clad of the single clad fiber. Patent Literature 2 also discloses a technique according to which residual excitation light is converted into heat with use of a heat dissipation plate, by covering a fusion splice point between a double clad fiber and a single clad fiber with a resin having a high refractive index.

Moreover, Patent Literature 3 discloses a technique for removing residual excitation light that is propagating through a clad of a single clad fiber. According to the technique, such residual excitation light is removed, by providing a guide member to the single clad fiber that is fusion spliced to a double clad fiber. This guide member is a cylindrical member which has a higher refractive index than the clad of the single clad fiber and which tightly adheres to the single clad fiber.

Further, Patent Literature 4 discloses a technique for removing residual leaking light that has entered a clad of a single-mode polarization maintaining fiber from a double-clad polarization maintaining fiber. The residual leaking light is removed by a configuration where: the single-mode polarization maintaining fiber from which approximately 10 cm of a jacket is removed is wound into a coil having a diameter of 30 mm; and this wound single-mode polarization maintaining fiber is fixed to a metal plate.

CITATION LIST

Patent Literature

[Patent Literature 1]
Japanese Patent Application Publication, Tokukai, No. 2008-310277 (Publication Date: Dec. 25, 2008)
[Patent Literature 2]
Japanese Patent Application Publication, Tokukai, No. 2007-271786 (Publication Date: Oct. 18, 2007)
[Patent Literature 3]
Japanese Patent Application Publication, Tokukai, No. 2008-268747 (Publication Date: Nov. 6, 2008)
[Patent Literature 4]
Japanese Patent Application Publication, Tokukai, No. 2010-56265 (Publication Date: Mar. 11, 2010)

SUMMARY OF INVENTION

Technical Problem

However, the following problem occurs in the techniques as disclosed in Patent Literatures 1 and 2 according to which residual excitation light that has just entered a clad of a single clad fiber is caused to leak out, by covering a fusion splice point between a double clad fiber and a single clad fiber with a block made of a material with a high thermal conductivity.

That is, for example, in a case where the fusion splice point illustrated in FIG. 14 is covered with a high refractive index resin 57 as illustrated in FIG. 15, not only residual excitation light Lb having entered the clad 54$b$ of the fourth optical fiber 54 but also signal light La2 having entered the clad 54$b$ of the fourth optical fiber 54 leaks out of the fourth optical fiber 54. In other words, all light having entered the fourth optical fiber 54 except signal light La1 having entered the core 54$a$ of the fourth optical fiber 54 leaks out of the fourth optical fiber 54 in the vicinity of the fusion splice point P4. Consequently, a lot of heat is generated in the vicinity of the fusion splice point P4. As a result, a heat dissipation mechanism is required for dealing with the heat inevitably becomes large in scale. Meanwhile, in a case where a sufficient heat dissipation mechanism cannot be provided, the jacket of the fourth optical fiber 54 may deteriorate or the fourth optical fiber 54 may be broken.

The present invention is attained in view of the above problem. An object of the present invention is to provide a fiber-optic system which is provided with no large-scale heat dissipation mechanism and which has a higher reliability than a conventional fiber-optic system.

Solution to Problem

In order to solve the above problem, a fiber-optic system of the present invention includes: a double clad fiber for amplifying light; a single clad fiber for transmitting the light amplified by the double clad fiber; and a triple clad fiber inserted between the double clad fiber and the single clad fiber.

Moreover, in order to solve the above problem, a method for producing a fiber-optic system includes the steps of: joining, to one end of a triple clad fiber, a double clad fiber for amplifying light; and joining, to the other end of the triple clad fiber, a single clad fiber for transmitting light amplified by the double clad fiber.

Advantageous Effects of Invention

According to the present invention, it is possible to provide a fiber-optic system which is provided with no large-scale heat dissipation mechanism but has a higher reliability as compared to a conventional fiber-optic system.

Figure 3:
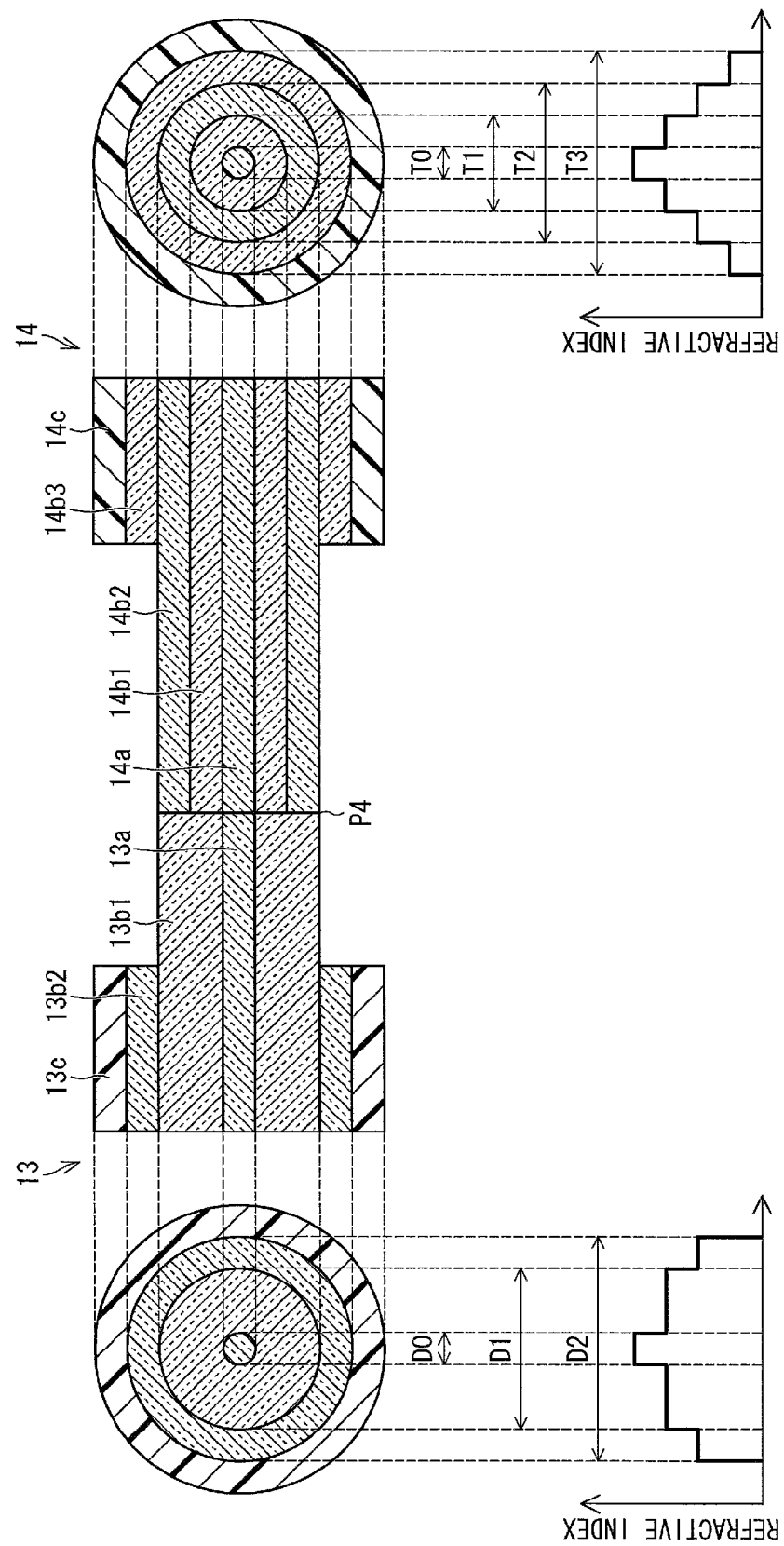
FIG. 3 is a cross sectional view illustrating respective structures of a third optical fiber (double clad fiber) and a fourth optical fiber (triple clad fiber) that are included in the fiber amplifier of FIG. 1.
Figure 5:
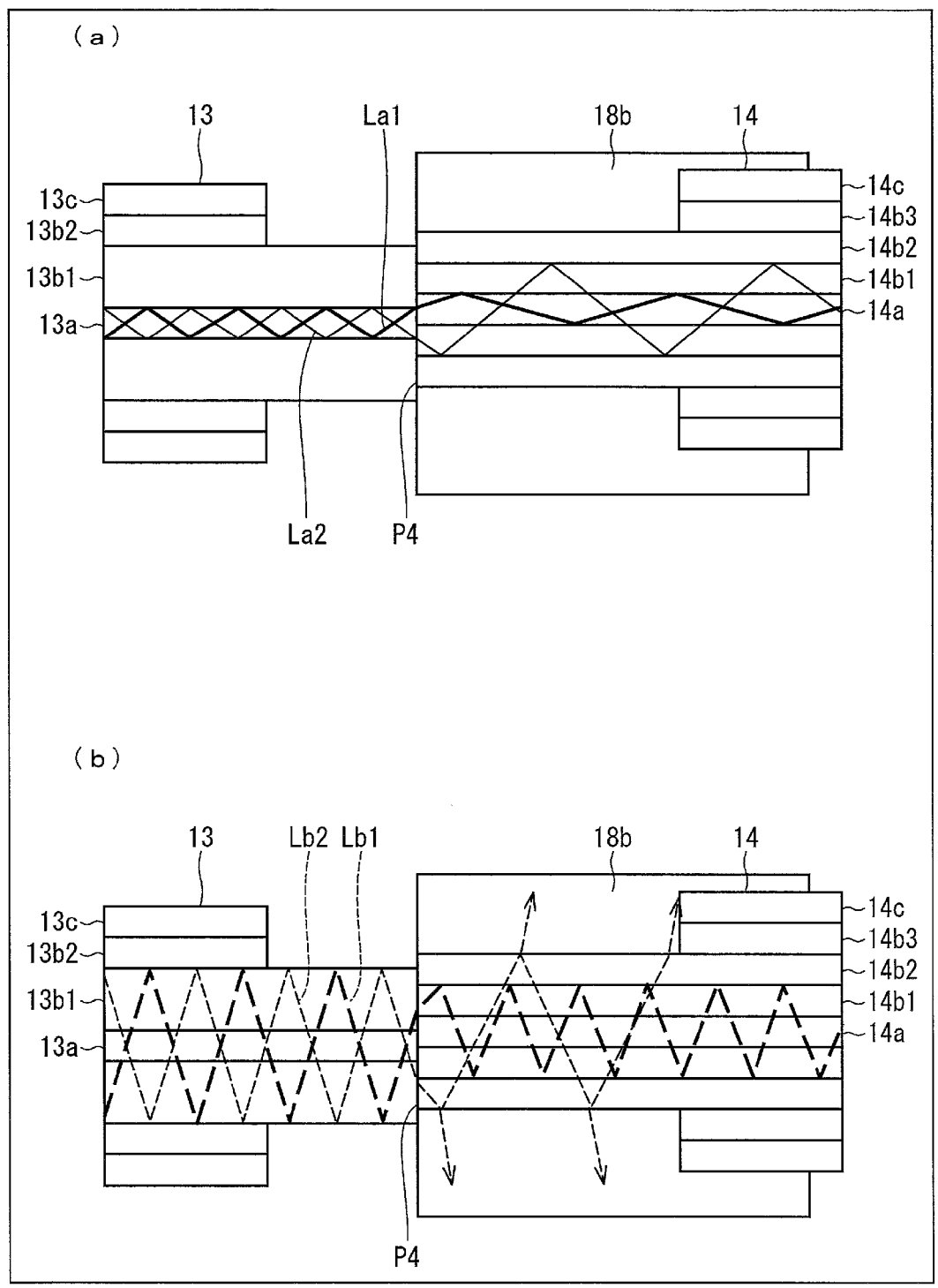

(a) of FIG. 5 is a schematic view illustrating a state of propagation of signal light in the vicinity of a fusion splice point illustrated in FIG. 3. (b) of FIG. 5 is a schematic view illustrating a state of propagation of excitation light in the vicinity of the fusion splice point illustrated in FIG. 3.

Figure 4:
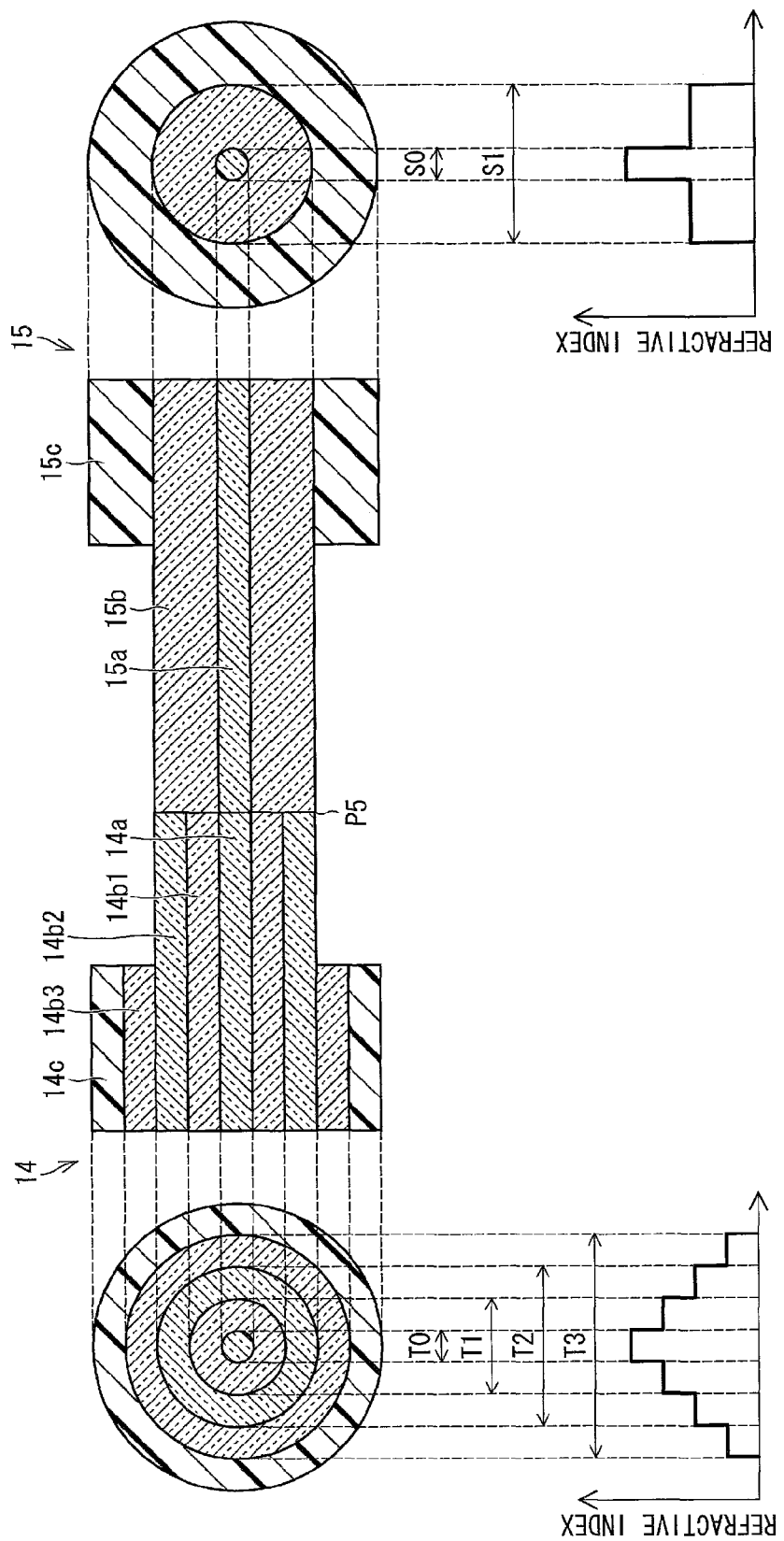
FIG. 4 is a cross sectional view illustrating respective structures of a fourth optical fiber (triple clad fiber) and a fifth optical fiber (single clad fiber) that are included in the fiber amplifier of FIG. 1.
Figure 6:
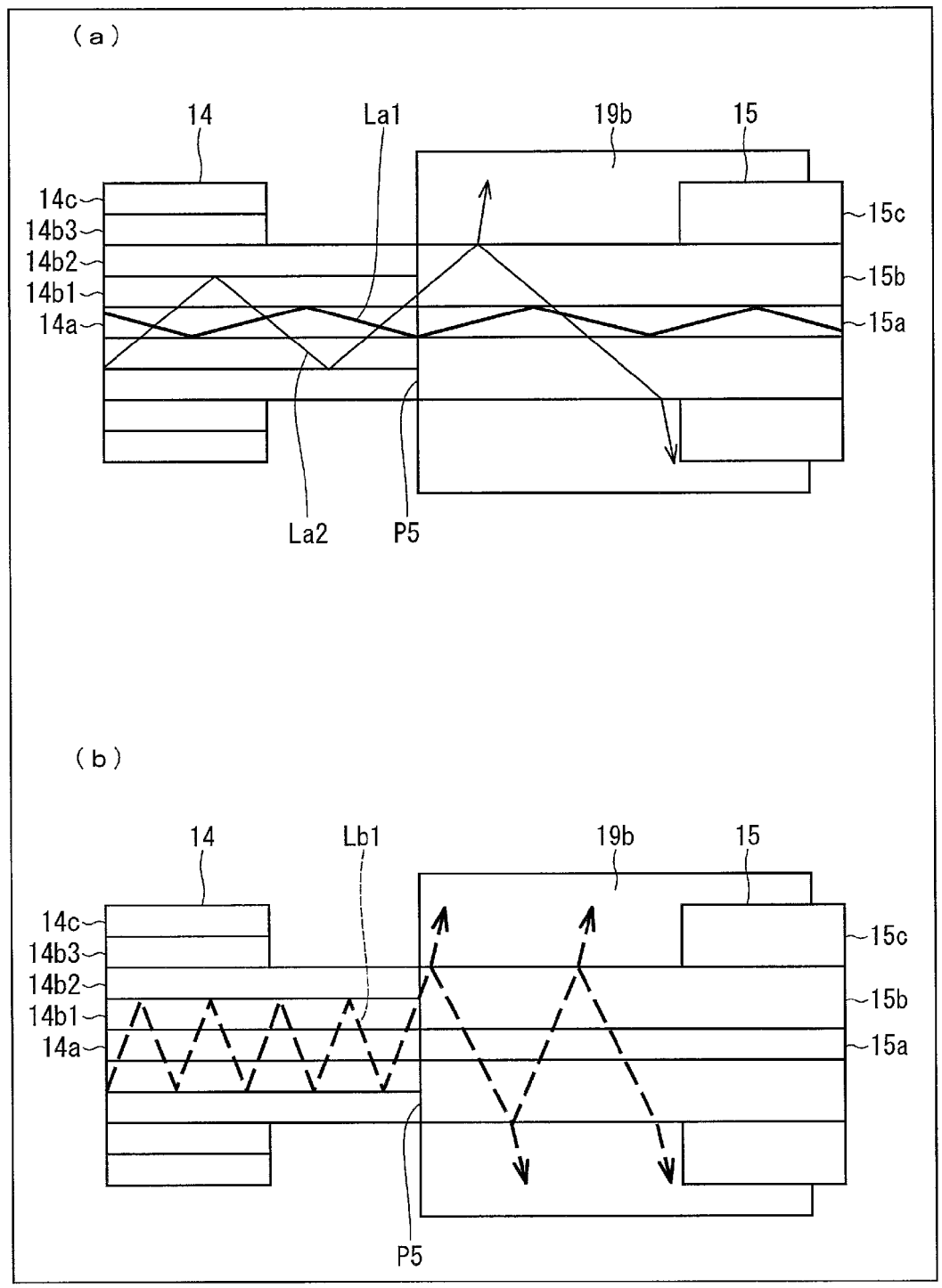

(a) of FIG. 6 is a schematic view illustrating a state of propagation of signal light in the vicinity of a fusion splice point illustrated in FIG. 4. (b) of FIG. 6 is a schematic view illustrating a state of propagation of excitation light in the vicinity of the fusion splice point illustrated in FIG. 4.

Figure 1:
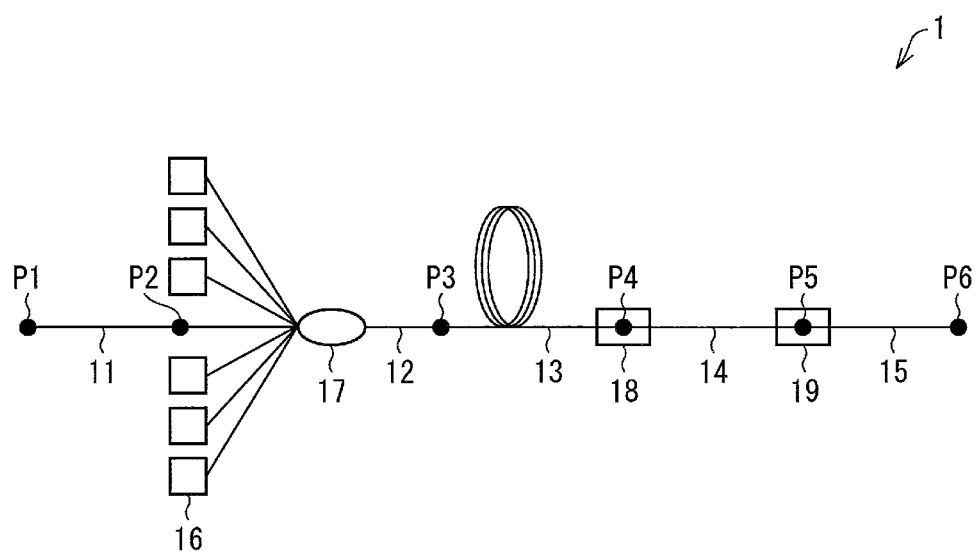
FIG. 1 is a block diagram illustrating an overall picture of a fiber amplifier according to an embodiment of the present invention.

FIG. 7 is a view illustrating, as an example configuration of a fourth optical fiber included in the fiber amplifier of FIG. 1, a case where the fourth optical fiber is made of three triple clad fibers.

Figure 8:
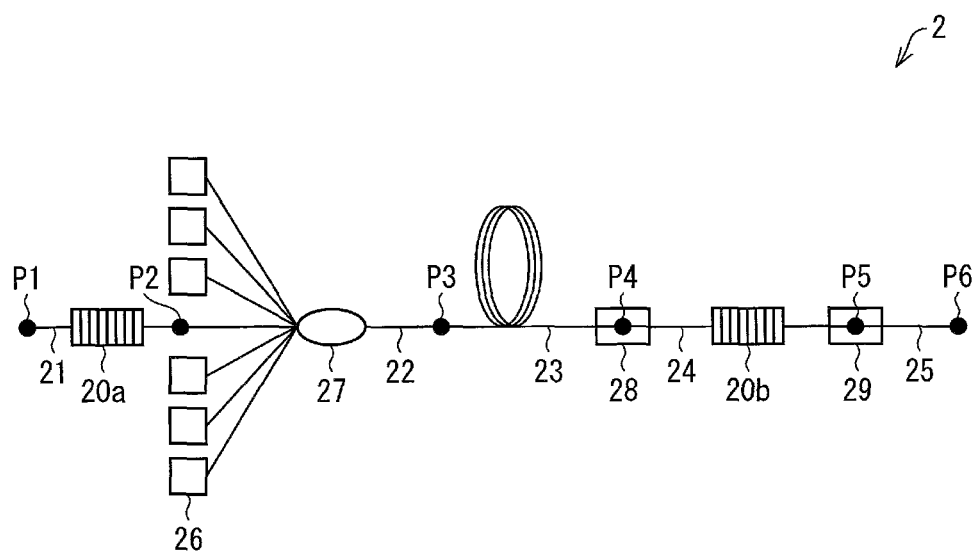

FIG. 8 is a block diagram illustrating an overall picture of a fiber laser (forward pumping) according to an embodiment of the present invention.

Figure 9:
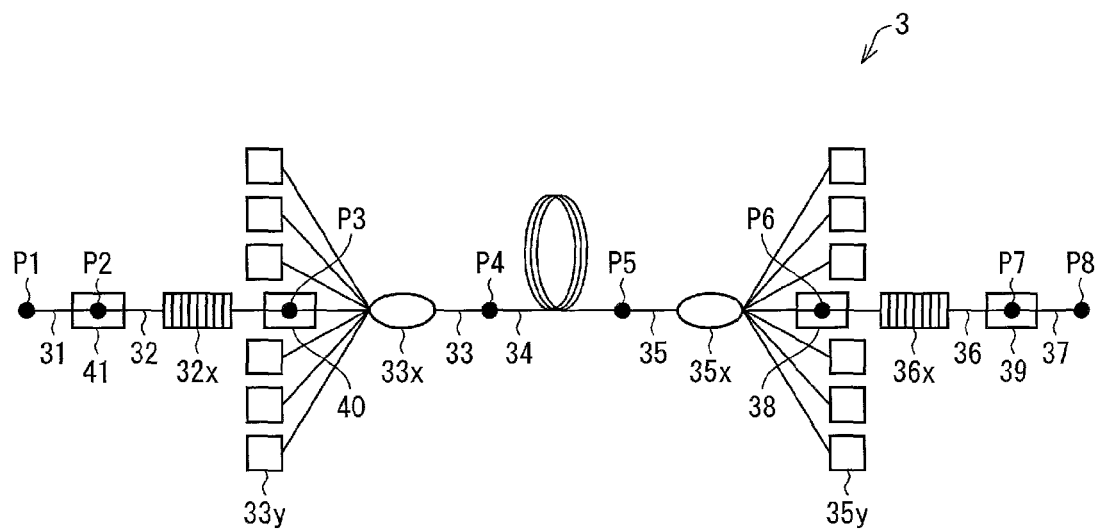

FIG. 9 is a block diagram illustrating an overall picture of another fiber laser (bidirectional pumping) according to an embodiment of the present invention.

Figure 10:
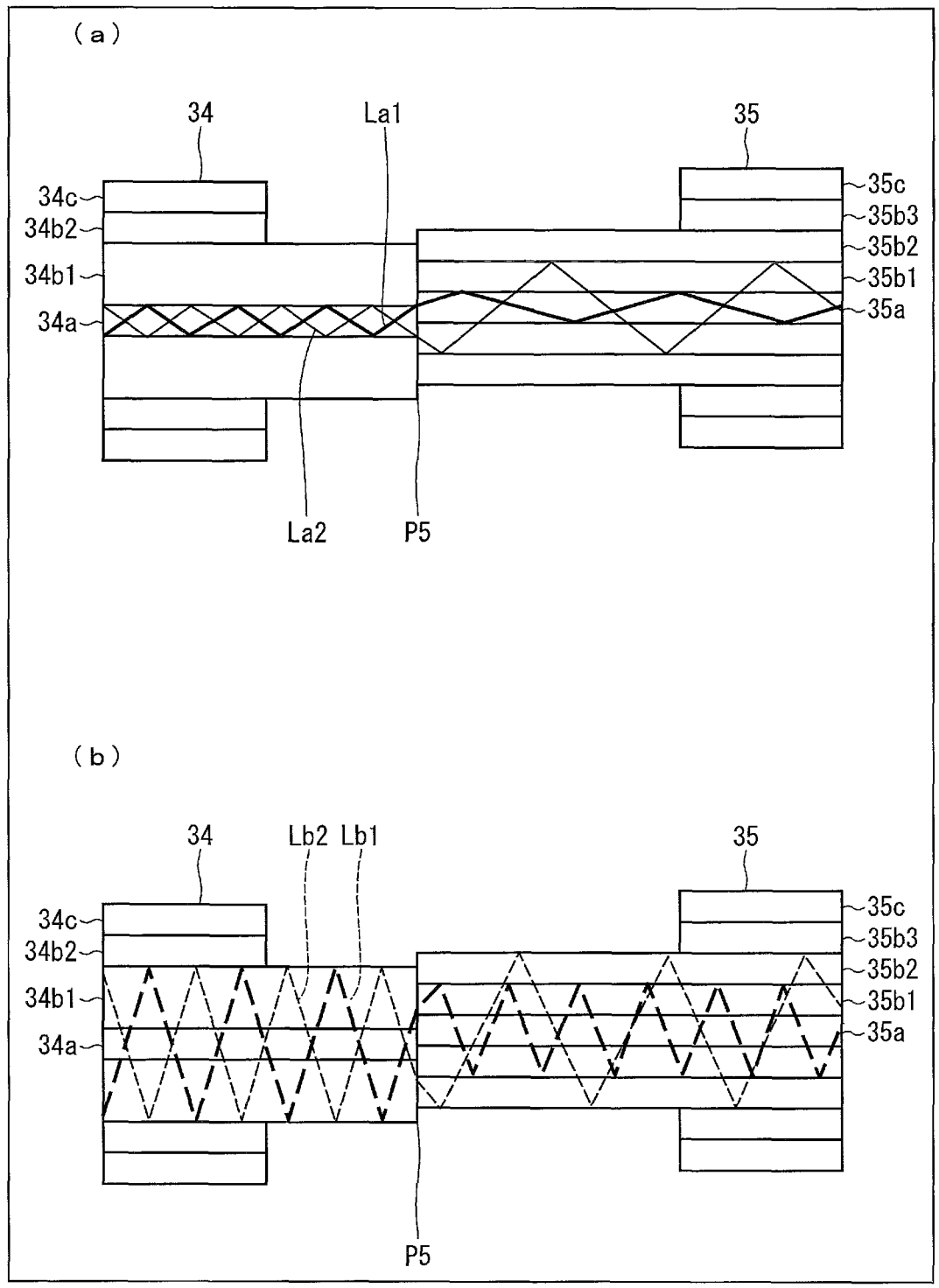

FIG. 10 is a schematic view illustrating a state of propagation of signal light and excitation light in the vicinity of a fusion splice point between a third optical fiber (double clad fiber) and a fourth optical fiber (triple clad fiber) that are included in the fiber laser of FIG. 9.

Figure 11:
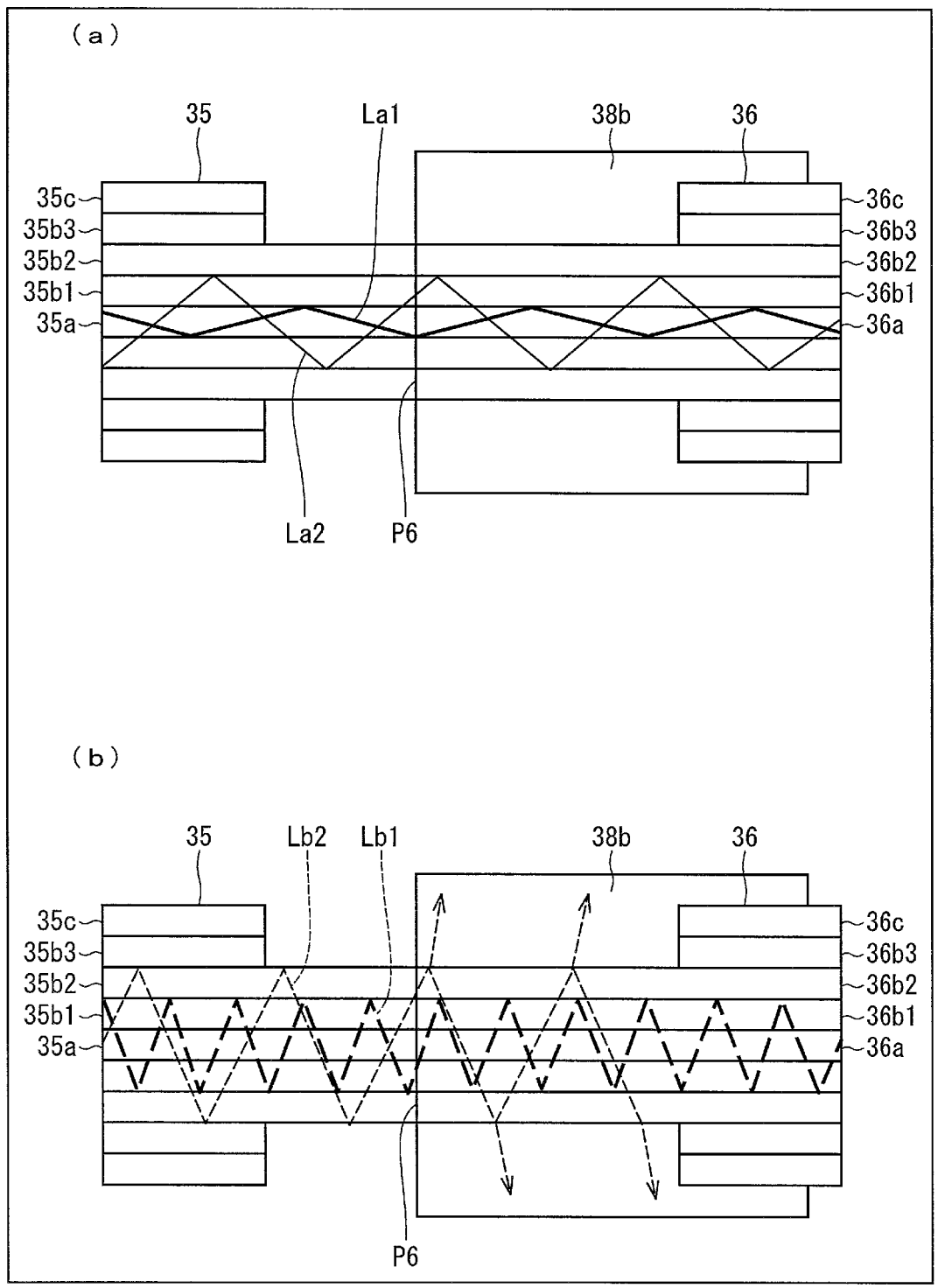

FIG. 11 is a schematic view illustrating a state of propagation of signal light and excitation light in the vicinity of a fusion splice point between a fourth optical fiber (triple clad fiber) and a fifth optical fiber (triple clad fiber) that are included in the fiber laser of FIG. 9.

Figure 12:
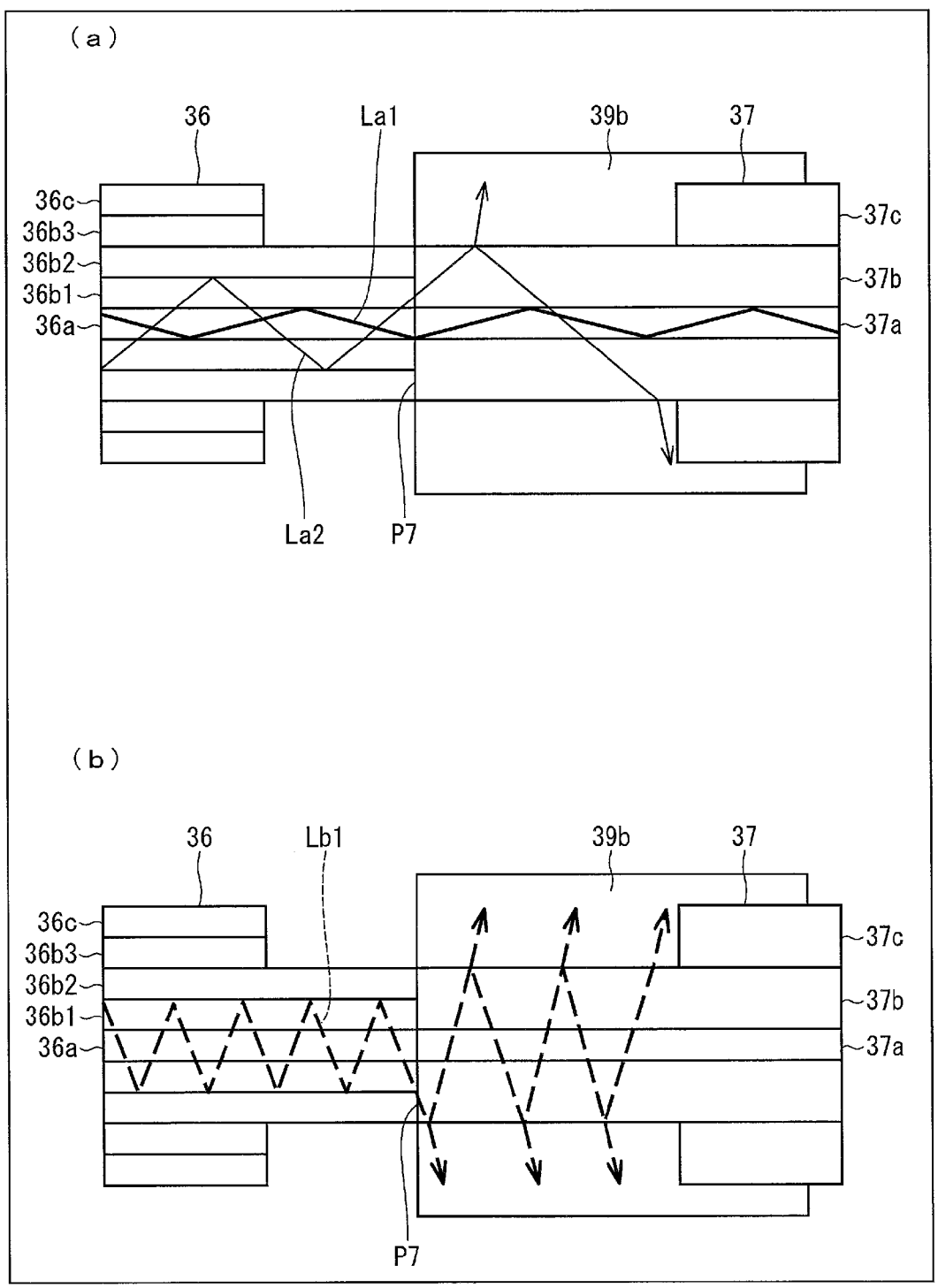

FIG. 12 is a schematic view illustrating a state of propagation of signal light and excitation light in the vicinity of a fusion splice point between a fifth optical fiber (triple clad fiber) and a sixth optical fiber (single clad fiber) that are included in the fiber laser of FIG. 9.

Figure 13:
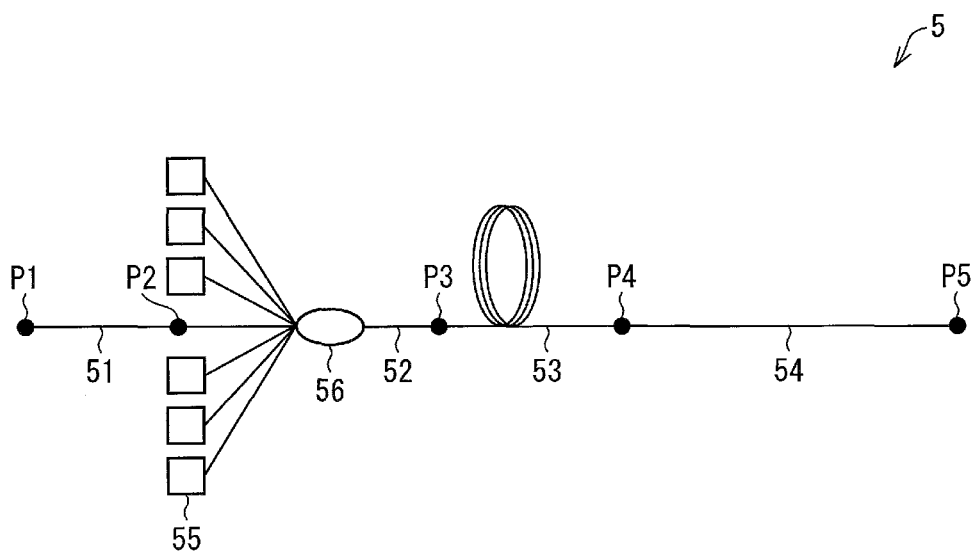

FIG. 13 is a block diagram illustrating an overall picture of a conventional fiber amplifier.

FIG. 14 is a schematic view illustrating a state of propagation of signal light and excitation light in the vicinity of a fusion splice point between a third optical fiber (double clad fiber) and a fourth optical fiber (single clad fiber) that are included in the fiber laser of FIG. 13. Note that FIG. 14 is related to a case where the fusion splice point is not embedded in a high refractive index resin.

FIG. 15 is a schematic view illustrating a state of propagation of signal light and excitation light in the vicinity of a fusion splice point between a third optical fiber (double clad fiber) and a fourth optical fiber (single clad fiber) that are included in the fiber laser of FIG. 13. Note that FIG. 14 is related to a case where the fusion splice point is embedded in a high refractive index resin.

DESCRIPTION OF EMBODIMENTS

In the present specification, layers constituting a clad of a multi-clad fiber are referred to as a first clad, a second clad, and a third clad, respectively, from an inner periphery clad to an outer periphery clad. In other words, even when not specifically noted, the first clad indicates an innermost periphery clad, the second clad indicates a second clad as counted from the innermost periphery clad, and the third clad indicates a third clad as counted from the innermost periphery clad. Further, even when not specifically noted, a refractive index of the first clad is lower than that of a core and a refractive index of the third clad is lower than that of the second clad.

First Embodiment

The following discusses a fiber-optic system according to First Embodiment of the present invention, with reference to FIGS. 1 through 7. Note that the fiber-optic system of the present embodiment constitutes a fiber amplifier. Accordingly, in the following description, the fiber-optic system of the present embodiment is referred to as a fiber amplifier.

[Overall Picture of Fiber Amplifier]

First, the following discusses an overall picture of a fiber amplifier 1 according to the present embodiment, with reference to FIG. 1. FIG. 1 is a block diagram illustrating an overall picture of the fiber amplifier 1.

The fiber amplifier 1 is a fiber-optic system including a plurality of optical fibers, as illustrated in FIG. 1. In the following description, the optical fibers constituting the fiber amplifier 1 is divided into five segments. These five segments are referred to as a first optical fiber 11, a second optical fiber 12, a third optical fiber 13, a fourth optical fiber 14, and a fifth optical fiber 15, respectively. Further, a fusion splice point between the first optical fiber 11 and the second optical fiber 12 is referred to as P2, a fusion splice point between the second optical fiber 12 and the third optical fiber 13 is referred to as P3, and a fusion splice point between the third optical fiber 13 and the fourth optical fiber 14 is referred to as P4.

The first optical fiber 11 is an optical fiber for taking in signal light. The first optical fiber 11 is made of a single clad fiber or a double clad fiber. The first optical fiber 11 has an incident end P1 to which a signal light source (not illustrated) is connected. After signal light enters the first optical fiber 11 from the signal light source via the incident end P1 and then propagates through the first optical fiber 11, the signal light enters the second optical fiber 12 via the fusion splice point P2.

The second optical fiber 12 is an optical fiber for taking in excitation light. In the second optical fiber 12, a pump combiner 17 is inserted. To this pump combiner 17, at least one (six in an example illustrated in FIG. 1) excitation light source 16 is connected. In the second optical fiber 12, a segment portion from the fusion splice point P2 to the pump combiner 17 is made of a single clad fiber and a segment portion from the pump combiner 17 to the fusion splice point P3 is made of a double clad fiber. After signal light enters a core of the second optical fiber 12 from the first optical fiber 11 via the fusion splice point P2 and then propagates through the second optical fiber 12, the signal light enters the third optical fiber 13 via the light fusion splice point P3. Meanwhile, after excitation light enters a first clad of the second optical fiber 12 from the excitation light source 16 via the pump combiner 17 and then propagates through the second optical fiber 12, the excitation light enters the third optical fiber 13 via the fusion splice point P3.

The third optical fiber 13 is an amplification optical fiber for amplifying signal light. The third optical fiber 13 is made of a double clad fiber. In a core 13a (see FIG. 3) of the third optical fiber 13, an active element such as a rare earth element is added. After the excitation light having entered the third optical fiber 13 from the second optical fiber 12 via the fusion splice point P3 propagates through a first clad 13b1 (see FIG. 3) of the third optical fiber 13, the excitation light enters the fourth optical fiber 14 via the fusion splice point P4. This excitation light causes a transition of a state of the active element added to the core 13a to a state of population inversion. Meanwhile, after the signal light having entered the third optical fiber 13 from the second optical fiber 12 via the fusion splice point P3 propagates the core 13a of the third optical fiber 13, the signal light enters the fourth optical fiber 14 via the fusion splice point P4. The active element added to the core 13a of the third fiber 13 is made to cause simulated emission by the signal light. Because the active element is kept in the state of population inversion by the excitation light, the number of photons emitted from the active element in the stimulated emission exceeds the number of photons absorbed by the active element. In other words, the signal light having entered the third optical fiber 13 is amplified during a process in which the signal light propagates through the core 13a of the third optical fiber 13. Note that a structure of the third optical fiber 13 will be discussed later with reference to different drawings.

The fourth optical fiber 14 and the fifth optical fiber 15 are transmission optical fibers for transmitting the amplified signal light. The fourth optical fiber 14 is made of a triple clad fiber, while the fifth optical fiber 15 is made of a single clad fiber. That is, whereas a single clad fiber (fourth optical fiber 54) is employed as a transmission optical fiber in a conventional fiber amplifier 5, the triple clad fiber (fourth optical fiber 14) and the single clad fiber (fifth optical fiber 15) are employed as transmission optical fibers in the fiber amplifier 1 of the present embodiment. In other words, the triple clad fiber (fourth optical fiber 14) is inserted between the amplification double clad fiber (third optical fiber 13) and the transmission single clad fiber (fifth optical fiber 15). Inserting a triple clad fiber between an amplification double clad fiber and a transmission single clad fiber simply means joining the amplification double clad fiber to one end of the triple clad fiber and further joining the transmission single clad fiber to the other end of the triple clad fiber. Note that structures of the fourth optical fiber 14 and the fifth optical fiber 15 will be discussed later with reference to different drawings.

In a case where no axial misalignment occurs between the third optical fiber 13 and the fourth optical fiber 14, the signal light having entered the fourth optical fiber 14 from the core 13a of the third optical fiber 13 via the fusion splice point P4 is coupled to a core 14a (see FIG. 3) of the fourth optical fiber 14. Meanwhile, in a case where axial misalignment occurs between the third optical fiber 13 and the fourth optical fiber 14, the signal light having entered the fourth optical fiber 14 from the core 13a of the third optical fiber 13 via the fusion splice point P4 is coupled to the core 14a and a first clad 14b1 (see FIG. 3) of the fourth optical fiber 14.

Then, after the signal light (hereinafter, also referred to as a "core mode signal light") coupled to the core 14a of the fourth optical fiber 14 propagates through the core 14a of the fourth optical fiber 14, the signal light enters the fifth optical fiber 15 via the fusion splice point P5. The core mode signal light having entered the fifth optical fiber 15 as described above is coupled to a core 15a of the fifth optical fiber 15. Then, after the core mode signal light coupled to the core 15a of the fifth optical fiber 15 propagates through the core 15a of the fifth optical fiber 15, the single light is outputted to an outside from an output end P6.

On the other hand, after the signal light (hereinafter, also referred to as "clad mode signal light") coupled to the first clad 14b1 of the fourth optical fiber 14 propagates through the first clad 14b1 of the fourth optical fiber 14, the signal light enters the fifth optical fiber 15 via the fusion splice point P5. The clad mode signal light having entered the fifth optical fiber 15 as described above is coupled to a clad 15b (see FIG. 4) of the fifth optical fiber 15. Then, the clad mode signal light coupled to the clad 15b of the fifth optical fiber 15 leaks outside of the fifth optical fiber 15 in the vicinity of the fusion splice point P5. The clad mode signal light having leaked out of the fifth optical fiber 15 is converted into heat by a heat dissipating section 19.

Residual excitation light (excitation light that has not been absorbed by the active element in the third optical fiber 13 but remains) having entered the fourth optical fiber 14 from the first clad 13b1 of the third optical fiber 13 via the fusion splice point P4 is coupled to the first clad 14b1 and a second clad 14b2 of the fourth optical fiber 14.

After the residual excitation light coupled to the first clad 14b1 of the fourth optical fiber 14 propagates the first clad 14b1 of the fourth optical fiber 14, the residual excitation light enters the fifth optical fiber 15 via the fusion splice point P5. The residual excitation light having entered the fifth optical fiber 15 as described above is coupled to the clad 15b of the fifth optical fiber 15. Thereafter, the residual excitation light coupled to the clad 15b of the fifth optical fiber 15 leaks outside of the fifth optical fiber 15 in the vicinity of the fusion splice point P5. The residual excitation light having leaked out of the fifth optical fiber 15 is converted into heat by the heat dissipating section 19.

Meanwhile, the residual excitation light coupled to the second clad 14b2 of the fourth optical fiber 14 leaks outside of the fourth optical fiber 14 in the vicinity of the fusion splice point P4. The residual excitation light having leaked out of the fourth optical fiber 14 in the vicinity of the fusion splice point P4 is converted into heat by the heat dissipating section 18. An example configuration of the heat dissipating section 18 will be discussed later with reference to a different drawing.

As described above, the fiber amplifier 1 of First Embodiment is configured so that part of the residual excitation light is converted into heat by the heat dissipating section 18, while the clad mode signal light and the rest of the residual excitation light are converted into heat by the heat dissipating section 19. This configuration makes it possible to suppress more a quantity of heat generated in each of the heat dissipating sections 18 and 19, as compared to that in a configuration where the residual excitation light and the clad mode signal light are converted into heat in a single heat dissipating section.

[Example Configuration of Heat Dissipating Section]

Figure 2:
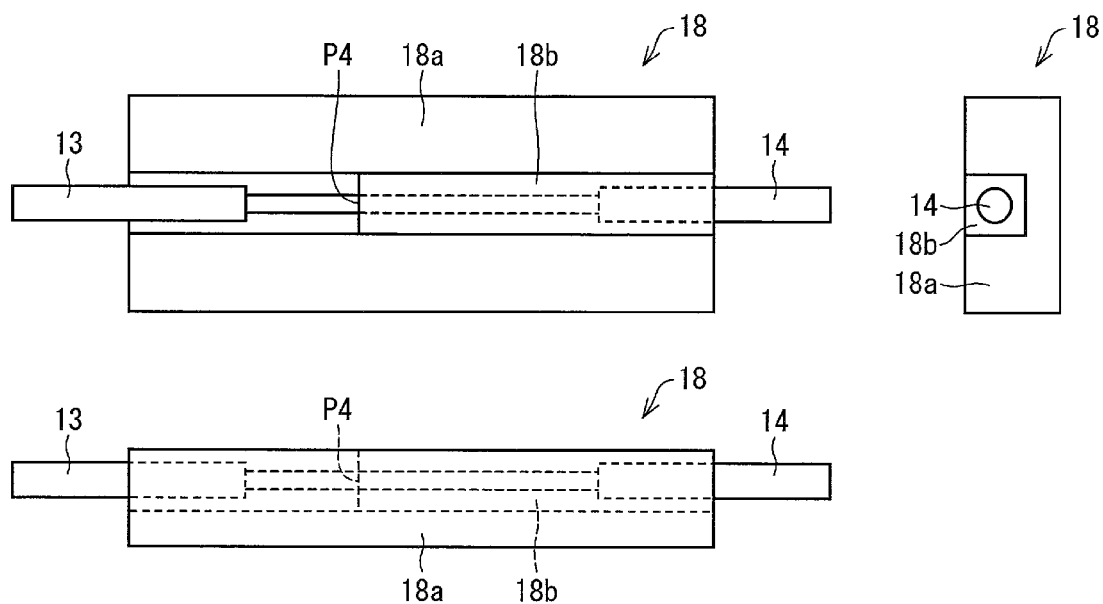
FIG. 2 is a diagram of three orthographic views illustrating a configuration of a heat dissipating section included in the fiber amplifier illustrated in FIG. 1.

Next, The following discusses an example configuration of the heat dissipating section 18 provided to the fusion splice point P4, with reference to FIG. 2. FIG. 2 is a diagram of three orthographic views illustrating an example configuration of this heat dissipating section 18.

As illustrated in FIG. 2, the heat dissipating section 18 is made of a metal plate 18a and a high refractive index resin 18b. A top surface of the metal plate 18a is provided with a groove that extends from one end surface to the other end surface and that is parallel to a longitudinal axis. The third optical fiber 13 and the fourth optical fiber 14 are fit in this groove. Further, as illustrated in FIG. 2, a portion of the fourth optical fiber 14 in the vicinity of the fusion splice point P4 is embedded in the high refractive index resin 18b that is filled in the groove, so that the clad mode signal light having entered the second clad 14b2 is caused to leak out. The high refractive index resin 18b of the heat dissipating section 18 in use here has a higher refractive index than the second clad 14b2 of the fourth optical fiber 14. Meanwhile, as illustrated in FIG. 2, a portion of the third optical fiber 13 in the vicinity of the fusion splice point P4 is placed in the air (whose refractive index is lower than that of the first clad 13b1) so that leakage of the residual excitation light propagating through the first clad 13b1 is avoided. Note that it is possible to employ a configuration where a portion of the third optical fiber 13 in the vicinity of the fusion splice point P4 is embedded in a low refractive index resin (resin whose refractive index is lower than that of the first clad 13b1 of the third optical fiber 13) that is filled in the groove.

The fourth optical fiber 14 has a portion where a jacket 14c and a third clad 14b3 are removed in the vicinity of the fusion splice point P4 and the second clad 14b2 is exposed. Accordingly, the residual excitation light having entered the second clad 14b2 of the fourth optical fiber 14 via the fusion splice point P4 leaks into the high refractive index resin 18b in the vicinity of the fusion splice point P4. Then, the residual excitation light is converted into heat by the metal plate 18a. In a configuration where a heat sink or the like is provided in contact with a lower surface of the metal plate 18a, more effective heat dissipation is achieved.

Note that heat dissipating section 19 provided to the fusion splice point P5 can be configured like the heat dissipating section 18 provided to the fusion splice point P4. A high refractive index resin 19b of the heat dissipating section 19 employed here should have a higher refractive index as compared to the clad 15b of the fifth optical fiber 15. Note that because the residual excitation light has already been removed from the second clad 14b2 of the fourth optical fiber 14, it is possible to employ a configuration in which not only a portion of the fifth optical fiber 15 in the vicinity of the fusion splice point P5 but also a portion of the fourth optical fiber 14 in the vicinity of the fusion splice point P5 is embedded in the high refractive index resin 19b in the heat dissipating section 19.

[Structures of Third Optical Fiber and Fourth Optical Fiber]

Next, the following discusses respective structures of the third optical fiber 13 and the fourth optical fiber 14 and states of propagation of signal light and excitation light in the vicinity of the fusion splice point P4, with reference to FIGS. 3 and 5. FIG. 3 is a cross sectional view illustrating the respective structures of the third optical fiber 13 and the fourth optical fiber 14. FIG. 5 is a schematic view illustrating states of propagation of signal light and excitation light in the vicinity of the fusion splice point P4. Note that FIG. 3 illustrates respective refractive index distributions of the third optical fiber 13 and the fourth optical fiber 14 as well as a longitudinal cross section (cross section parallel to a longitudinal axis) and a transverse cross section (cross section perpendicular to the longitudinal axis) of each of the third optical fiber 13 and the fourth optical fiber 14.

The third optical fiber 13 is made of a double clad fiber as described above and has a transverse cross section having a four-layer structure that includes (1) the core 13a in the form of a circular disc (diameter: D0), (2) the first clad 13b1 in the form of a circular ring (outer diameter: D1), which first clad 13b1 surrounds the core 13a, (3) a second clad 13b2 in the form of a circular ring (outer diameter: D2), which second clad 13b2 surrounds the first clad 13b1, and (4) a jacket 13c in the form of a circular ring, which jacket 13c surrounds the second clad 13b2. The core 13a and the first clad 13b1 are made of glass, while the second clad 13b2 and the jacket 13c are made of resin (e.g., polymer resin). In the vicinity of the fusion splice point P4, the second clad 13b2 and the jacket 13c each made of resin are removed while the first clad 13b1 made of glass is exposed.

In the third optical fiber 13, the first clad 13b1 has a lower refractive index than the core 13a. This results in confinement of light in the core 13a. Further, in the third optical fiber 13, the second clad 13b2 has a lower refractive index than the first clad 13b1. This results in confinement of light in the first clad 13b1. Note that in the third optical fiber 13, regardless of whether the jacket 13c is non-transparent or transparent, the jacket 13c has a higher refractive index than the second clad 13b2. Therefore, the jacket 13c does not realize confinement of light in the second clad 13b2. In this sense, the jacket 13c cannot be taken as a third clad.

The fourth optical fiber 14 is made of a triple clad fiber as described above and has a transverse cross section having a five-layer structure that includes (1) the core 14a in the form of a circular disc (diameter: T0), (2) the first clad 14b1 in the form of a circular ring (outer diameter: T1), which first clad 14b1 surrounds the core 14a, (3) the second clad 14b2 in the form of a circular ring (outer diameter: T2), which second clad 14b2 surrounds the first clad 14b1, (4) the third clad 14b3 in the form of a circular ring (outer diameter: T3), which third clad 14b3 surrounds the second clad 14b2, and (5) the jacket 14c in the form of a circular ring, which jacket 14c surrounds the third clad 14b3. The core 14a, the first clad 14b1 and the second clad 14b2 are made of glass, while the third clad 14b3 and the jacket 14c are made of resin (e.g., polymer resin). In the vicinity of the fusion splice point P4, the third clad 14b2 and the jacket 14c each made of resin are removed while the first clad 14b1 and the second clad 14b2 made of glass are exposed.

In the fourth optical fiber 14, the first clad 14b1 has a lower refractive index than the core 14a. This results in confinement of light in the core 14a. Further, in the fourth optical fiber 14, the second clad 14b2 has a lower refractive index than the first clad 14b1. This results in confinement of light in the first clad 14b1. Furthermore, in the fourth optical fiber 14, the third clad 14b3 has a lower refractive index than the second clad 14b2. This results in confinement of light in the second clad 14b2. Note that regardless of whether the jacket 14c is non-transparent or transparent, the jacket 14c has a higher refractive index than the third clad 14b3. Therefore, the jacket 14c does not realize confinement of light in the third clad 14b3. In this sense, the jacket 14c cannot be taken as a fourth clad.

As illustrated in FIG. 3, First Embodiment is arranged so that: a core diameter (that means the same as the diameter of the core 13a) D0 of the third optical fiber 13 is arranged to be the same as a core diameter (that means the same as the diameter of the core 14a) T0 of the fourth optical fiber 14; and at the same time, a first clad diameter (that means the same as the outer diameter of the first clad 13b1) D1 of the third optical fiber 13 is arranged to be the same as a second clad diameter (that means the same as the outer diameter of the second clad 14b2) T2 of the fourth optical fiber 14. Accordingly, a relation of the core diameter D0 of the third optical fiber 13, the first clad diameter D1 of the third optical fiber 13, and the first clad diameter T1 of the fourth optical fiber 14 is expressed by an inequality expression D0<T1<D1.

Here, the inequality expression D0<T1 means that at the fusion splice point P4, the core 13a of the third optical fiber 13 is contained in a region consisting of the core 14a and the first clad 14b1 of the fourth optical fiber 14 and the core 13a of the third optical fiber 13 does not overlap with (does not coincide at all with) the second clad 14b2 of the fourth optical fiber 14. This relation ensures coupling, to either the core 14a or the first clad 14b1 of the fourth optical fiber 14, signal light that enters the fourth optical fiber 14 from the core 13a of the third optical fiber 13 via the fusion splice point P4. In other words, the above relation ensures that the signal light is not coupled to the second clad 14b2 of the fourth optical fiber 14.

Accordingly, as illustrated in (a) of FIG. 5, part of signal light La1, La2, which enters the fourth optical fiber 14 from the core 13a of the third optical fiber 13, enters the core 14a of the fourth optical fiber 14. Meanwhile, the rest of the signal light La1, La2 enters the first clad 14b1 of the fourth optical fiber 14. The signal light La1 having entered the core 14a of the fourth optical fiber 14 becomes core mode signal light that propagates through the core 14a of the fourth optical fiber 14. Meanwhile, the signal light La2 having entered the first clad 14b1 of the fourth optical fiber 14 becomes clad mode signal light that propagates through the first clad 14b1 of the fourth optical fiber 14. In other words, the signal light La1, La2, which enters the fourth optical fiber 14 from the core 13a of the third optical fiber 13, neither enters the second clad 14b2 of the fourth optical fiber 14 nor leaks out of the fourth optical fiber 14 in the vicinity of the fusion splice point P4.

Further, the inequality expression T1<D1 means that at the fusion splice point P4, the first clad 13b1 of the third optical fiber 13 is not contained in the first clad 14b1 of the fourth optical fiber 14 and the first clad 13b1 of the third optical fiber 13 overlaps with (coincides in part with) the first clad 14b1 and the second clad 14b2 of the fourth optical fiber 14. This relation ensures coupling, to both the first clad 14b1 and the second clad 14b2 of the fourth optical fiber 14, residual excitation light that enters the fourth optical fiber 14 from the first clad 13b1 of the third optical fiber 13 via the fusion splice point P4.

Accordingly, as illustrated in (b) of FIG. 5, part of residual excitation light Lb1, Lb2, which enters the fourth optical fiber 14 from the first clad 13b1 of the third optical fiber 13, enters the first clad 14b1 of the fourth optical fiber 14. Meanwhile, the rest of the residual excitation light Lb1, Lb2 enters the second clad 14b2 of the fourth optical fiber 14. Whereas the residual excitation light Lb1 having entered the first clad 14b1 of the fourth optical fiber 14 propagates through the first clad 14b1 of the fourth optical fiber 14, the residual excitation light Lb2 having entered the second clad 14b2 of the fourth optical fiber 14 leaks out of the fourth optical fiber 14 into the high refractive index resin 18b. Then, the residual excitation light Lb2 having leaked out of the fourth optical fiber 14 into the high refractive index resin 18b is converted into heat by the metal plate 18a that constitutes, together with the high refractive index resin 18b, the heat dissipating section 18.

Note that in a case where the core 13a of the third optical fiber 13 is contained in the core 14a of the fourth optical fiber 14 at the fusion splice point P4 as in First Embodiment, the following can be said. That is, as long as no axial misalignment occurs between the third optical fiber 13 and the fourth optical fiber 14, all signal light that enters the fourth optical fiber 14 from the core 13a of the third optical fiber 13 via the fusion splice point P4 is coupled to the core 14a of the fourth optical fiber 14. Accordingly, in this case, signal light coupled to the first clad 14b1 of the fourth optical fiber 14 is deemed to occur due to axial misalignment between the third optical fiber 13 and the fourth optical fiber 14. This is a reason why the clad mode signal light is described as being caused by axial misalignment between the third optical fiber 13 and the fourth optical fiber 14 in the discussion on FIG. 1.

[Structures of Fourth Optical Fiber and Fifth Optical Fiber]

Next, the following discusses respective structures of the fourth optical fiber 14 and the fifth optical fiber 15 and a state of propagation of signal light and excitation light in the vicinity of the fusion splice point P5, with reference to FIGS. 4 and 6. FIG. 4 is a cross sectional view illustrating the respective structures of the fourth optical fiber 14 and the fifth optical fiber 15. FIG. 6 is a schematic view illustrating states of propagation of signal light and excitation light in the vicinity of the fusion splice point P5. Note that FIG. 4 illustrates respective refractive index distributions of the fourth optical fiber 14 and the fifth optical fiber 15 as well as a longitudinal cross section (cross section parallel to a longitudinal axis) and a transverse cross section (cross section perpendicular to the longitudinal axis) of each of the fourth optical fiber 14 and the fifth optical fiber 15.

The structure of the fourth optical fiber 14 is arranged as discussed above with reference to FIG. 3 and an explanation thereof is not repeated here. Note that as in the configuration in the vicinity of the fusion splice point P4, in the vicinity of the fusion splice point P5, the third clad 14b3 and the jacket 14c each made of resin are removed while the second clad 14b2 made of glass is exposed.

The fifth optical fiber 15 is made of a single clad fiber as described above and has a three-layer structure that includes (1) the core 15a in the form of a circular disc (diameter: S0), (2) the clad 15b in the form of a circular ring (outer diameter: S1), which clad 15b surrounds the core 15a, and (3) a jacket 15c in the form of a circular ring, which jacket 15c surrounds the clad 15b. The core 15a and the clad 15b are made of glass, while the jacket 15c is made of resin (e.g., polymer resin). In the vicinity of the fusion splice point P5, the jacket 15c made of resin is removed while the clad 15b made of glass is exposed.

In the fifth optical fiber 15, the clad 15b has a lower refractive index than the core 15a. This results in confinement of light in the core 15a. Note that regardless of whether the jacket 15c is non-transparent or transparent, the jacket 15c has a higher refractive index than the clad 15b. Therefore, the jacket 15c does not realize confinement of light in the clad 15b. In this sense, the jacket 15c cannot be taken as a second clad.

As illustrated in FIG. 4, First Embodiment is arranged so that: (a) the core diameter T0 of the fourth optical fiber 14 is arranged to be the same as a core diameter (that means the same as the diameter of the core 15a) S0 of the fifth optical fiber 15; and (b) at the same time, the second clad diameter T2 of the fourth optical fiber 14 is arranged to be the same as a clad diameter (that means the same as the outer diameter of the second clad 15b) S1 of the fifth optical fiber 15. Accordingly, a relation of the core diameter T0 and the first clad diameter T1 of the fourth optical fiber 14, and the core diameter S0 of the fifth optical fiber 15 is expressed by an inequality expression T0≤S0<T1.

Here, the inequality expression T0≤S0 means that at the fusion splice point P5, the core 14a of the fourth optical fiber 14 is contained in the core 15a of the fifth optical fiber 15 and the core 14a of the fourth optical fiber 14 does not overlap with the clad 15b of the fifth optical fiber 15. This relation ensures coupling, to the core 15a of the fifth optical fiber 15, signal light that enters the fifth optical fiber 15 from the core 14a of the fourth optical fiber 14 via the fusion splice point P5, unless axial misalignment occurs between the fourth optical fiber 14 and the fifth optical fiber 15. In other words, it is ensured that the signal light is not coupled to the clad 15b of the fifth optical fiber 15.

Accordingly, as illustrated in (a) of FIG. 6, core mode signal light La1 having propagated through the core 14a of the fourth optical fiber 14 enters the core 15a of the fifth optical fiber 15. That is, the core mode signal light La1 having propagated through the core 14a of the fourth optical fiber 14 neither enters the clad 15b of the fifth optical fiber 15 nor leaks out of the fourth optical fiber 14 in the vicinity of the fusion splice point P5.

Further, the inequality expression S0<T1 means that at the fusion splice point P5, the first clad 14b1 of the fourth optical fiber 14 is not contained in the core 15a of the fifth optical fiber 15 and the first clad 14b1 of the fourth optical fiber 14 overlaps with (coincides in part with) the clad 15b of the fifth optical fiber 15. This relation ensures coupling, to the clad 15b of the fifth optical fiber 15, signal light and residual excitation light that enter the fifth optical fiber 15 from the first clad 14b1 of the fourth optical fiber 14 via the fusion splice point P5.

Accordingly, as illustrated in (a) of FIG. 6, clad mode signal light La2 having propagated through the first clad 14b1 of the fourth optical fiber 14 enters the clad 15b of the fifth optical fiber 15. Then, the clad mode signal light La2 having entered the clad 15b of the fifth optical fiber 15 leaks out of the fifth optical fiber 15 into the high refractive index resin 19b. Then, this clad mode signal light La2 is converted into heat by a metal plate that constitutes, together with the high refractive index resin 19b, the heat dissipating section 19.

Similarly, as illustrated in (b) of FIG. 6, residual excitation light Lb1 having propagated through the first clad 14b1 of the fourth optical fiber 14 enters the clad 15b of the fifth optical fiber 15. Then, the residual excitation light Lb1 having entered the clad 15b of the fifth optical fiber 15 leaks out of the fifth optical fiber 15 into the high refractive index resin 19b. Then, this residual excitation light Lb1 is converted into heat by the metal plate that constitutes, together with the high refractive index resin 19b, the heat dissipating section 19.

Note that in a case where a joint between the core 14a of the fourth optical fiber 14 and the clad 15b of the fifth optical fiber 15 is produced due to axial misalignment, part of the core mode signal light La1 having propagated through the core 14a of the fourth optical fiber 14 enters the clad 15b of the fifth optical fiber 15. In this case, like the clad mode signal light La2 and the residual excitation light Lb1 having entered the clad 15b of the fifth optical fiber 15, the core mode signal light La1 having entered the clad 15b of the fifth optical fiber 15 leaks out of the fifth optical fiber 15 into the high refractive index resin 19b. Then, this core mode signal light La1 is converted into heat by the metal plate that constitutes, together with the high refractive index resin 19b, the heat dissipating section 19.

[Distribution of Quantities of Heat Generated by Residual Excitation Light]

The heat dissipating section 19 and the heat dissipating section 18 each generate heat in accordance with the residual excitation light Lb1 and the residual excitation light Lb. Accordingly, by changing a ratio p1:p2 of a power p1 of the residual excitation light Lb1 and a power p2 of the residual excitation light Lb2, it is possible to change the a ratio q1:q2 of a quantity q1 of heat generated in the heat dissipating section 19 and a quantity q2 of heat generated in the heat dissipating section 18. Here, the residual excitation light Lb1 indicates light entering the first clad 14b1 out of the residual excitation light entering the fourth optical fiber 14, while the residual excitation light Lb2 indicates light entering the second clad 14b2 out of the residual excitation light entering the fourth optical fiber 14.

The power ratio p1/p2 of the residual excitation light Lb1 and the residual excitation light Lb2 is basically proportional to a cross sectional area ratio s1/s2 of the first clad 14b1 and the second clad 14b2 of the fourth optical fiber 14. For example, when a cross sectional area s1 of the first clad 14b1 is ½ of a cross sectional area s2 of the second clad 14b2, the power p1 of the residual excitation light Lb1 also becomes approximately ½ of the power p2 of the residual excitation light Lb2. Accordingly, the quantity q1 of heat generated in the heat dissipating section 19 also becomes approximately ½ of the quantity q2 of heat generated in the heat dissipating section 18. Therefore, when the fiber amplifier 1 is to be produced, a highly reliable fiber amplifier 1 can be obtained by setting the cross sectional area ratio s1/s2 in accordance with permissible generated heat quantities in the heat dissipating section 18 and the heat dissipating section 19.

Note that, strictly, the power ratio p1/p2 is not proportional to the cross sectional area ratio s1/s2. This is because the power ratio p1/p2 is also dependent on propagation angle distribution of residual excitation light (for example, even when residual excitation light having a large propagation angle enters the first clad 14b1, total reflection of the residual excitation light does not occur at a boundary plane between the first clad 14b1 and the second clad 14b2 but the residual excitation light leaks out into the second clad 14b2). However, an influence of a propagation angle distribution of the residual excitation light on the power ratio p1/p2 is sufficiently small, as compared to an influence of the cross sectional area ratio s1/s2 on the power ratio p1/p2. Therefore, when design for heat dissipation is to be made, the power ratio p1/p2 may be assumed to be proportional to the cross sectional area ratio s1/s2.

Note that in a case where the fourth optical fiber 14 is made of a plurality of triple clad fibers that are different from each other in first clad cross sectional area (more specifically, first clad diameters gradually decrease), it becomes possible to further remove in a stepwise manner the residual excitation light having entered the fourth optical fiber 14.

For example, in a case where the fourth optical fiber 14 is made of three triple clad fiber elements TCF1 to TCF3 as illustrated in FIG. 7, it becomes possible to remove the residual excitation light at a fusion splice point Q1 and a fusion splice point Q2 in addition to the fusion splice point P4 and the fusion splice point P5. Here, the fusion splice point Q1 is a point where the first triple clad fiber element TCF1 and the second triple clad fiber element TCF2 are joined to each other by fusion splice. At the fusion splice point Q1, a transverse cross section of a first clad of the first triple clad fiber element TCF1 overlaps with respective transverse cross sections of both a first clad and a second clad of the second triple clad fiber element TCF2. Further, the fusion splice point Q2 is a point where the second triple clad fiber element TCF2 and the third triple clad fiber element TCF3 are joined to each other by fusion splice. At the fusion splice point Q2, a transverse cross section of the first clad of the second triple clad fiber element TCF2 overlaps with respective transverse cross sections of both a first clad and a second clad of the third triple clad fiber element TCF3.

Note that in FIG. 7, black portions of the triple clad fibers element TCF1 to TCF3 each indicate a first clad. Moreover, the fusion splice point Q1 is embedded in a high refractive index resin (not illustrated) that has a higher refractive index than the second clad of the second triple clad fiber element TCF2. Meanwhile, the fusion splice point Q2 is embedded in a high refractive index resin (not illustrated) that has a higher refractive index than the second clad of the third triple clad fiber element TCF3.

In a case where a cross sectional area of the first clad of the first triple clad fiber element TCF1 is denoted by A1, a cross sectional area of the first clad of the second triple clad fiber element TCF2 is denoted by A2, and a cross sectional area of the first clad of the third triple clad fiber element TCF3 is denoted by A3, (A1−A2)/A1 of the residual excitation light having entered the first clad of the first triple clad fiber element TCF1 is removed at the fusion splice point Q1 and (A2−A3)/A2 of the residual excitation light having entered the first clad of the second triple clad fiber element TCF2 is removed at the fusion splice point Q2.

Second Embodiment

The following discusses a fiber-optic system according to Second Embodiment of the present invention, with reference to FIG. 8. Note that the fiber-optic system of Second Embodiment constitutes a fiber laser, and accordingly, hereinafter, this fiber-optic system is referred to as a fiber laser.

FIG. 8 is a block diagram illustrating a configuration of a fiber laser 2 according to Second Embodiment. As illustrated in FIG. 8, the fiber laser 2 is a forward pumping fiber laser including optical fibers 21 to 25.

The first optical fiber 21 (a single clad fiber or a double clad fiber), the second optical fiber 22 (a single clad fiber and a double clad fiber), the third optical fiber 23 (a double clad fiber), the fourth optical fiber 24 (a triple clad fiber), and the fifth optical fiber 25 (a single clad fiber), which constitute the fiber laser 2, correspond respectively to a first optical fiber 11, a second optical fiber 12, a third optical fiber 13, a fourth optical fiber 14, and a fifth optical fiber 15 which constitute a fiber amplifier 1 discussed above.

The fiber laser 2 is different from the fiber amplifier 1 in that (i) a fiber bragg grating 20a is inserted in the first optical fiber 21 and (ii) a fiber bragg grating 20b is inserted in the fourth optical fiber 24. In the fiber laser 2, the fiber bragg grating 20a serves as a mirror and the fiber bragg grating 20b serves as a half mirror. This causes recursive amplification of signal light having a specific wavelength, between these two fiber bragg gratings 20a and 20b. This results in laser oscillation.

The fiber laser 2 is similar to the fiber amplifier 1 in that at the fusion splice point P4 between the third optical fiber 23 and the fourth optical fiber 24, part of residual excitation light leaks out of the fourth optical fiber 24 and then the part of residual light is converted into heat in a heat dissipating section 28. Moreover, the fiber laser 2 is similar to the fiber amplifier 1 also in that at the fusion splice point P5 between the fourth optical fiber 24 and the fifth optical fiber 25, clad mode signal light and the rest of the residual excitation light leak out of the fifth optical fiber 25 and then these light are converted into heat in the heat dissipating section 29. In other words, like the fiber amplifier 1 of First Embodiment, the fiber laser 2 of Second Embodiment is configured such that part of the residual excitation light is converted into heat in the heat dissipating section 28 and the clad mode signal light and the rest of the residual excitation light are converted into heat in the heat dissipating section 29.

It was revealed in an experiment that in a case where the fiber laser 2 is configured as described above, a temperature of the heat dissipating section 28 can be suppressed to approximately 55° C. and a temperature of the heat dissipating section 29 can be suppressed to approximately 45° C. at a laser output at 300 W. According to a control experiment, when the clad mode signal light and the residual excitation light are converted into heat in a single heat dissipating section, a temperature of the heat dissipating section rises up to a level close to 100° C. In other words, it was confirmed by the experiments that the above configuration of Second Embodiment makes it possible to suppress respective temperatures of these two heat dissipating sections 28 and 29 so that the temperatures of the two heat dissipating sections 28 and 29 are lower than that of the single dissipation section. In a section between the two fiber bragg gratings 20a and 20b, light that leaks outside is only residual excitation light. Therefore, there is no risk of decrease in efficiency of the fiber laser 2 or deterioration in quality of oscillated signal light caused by introduction of the fourth optical fiber 24 that is made of a triple clad fiber.

Third Embodiment

The following discusses a fiber-optic system according to Third Embodiment of the present invention, with reference to FIGS. 9 through 12. Note that the fiber-optic system of Third Embodiment constitutes a fiber laser, and accordingly, hereinafter, the fiber-optic system of Third Embodiment is referred to as a fiber laser.

[Configuration of Fiber Laser]

First, the following discusses a configuration of a fiber laser 3 according to Third Embodiment, with reference to FIG. 9. FIG. 9 is a block diagram illustrating the configuration of the fiber laser 3 according to Third Embodiment.

As illustrated in FIG. 9, the fiber laser 3 is a bidirectional pumping fiber laser including a plurality of optical fibers. In the following description, the optical fibers constituting the fiber laser 3 is divided into seven segments. These seven segments are referred to as a first optical fiber 31, a second optical fiber 32, a third optical fiber 33, a fourth optical fiber 34, a fifth optical fiber 35, a sixth optical fiber 36, and a seventh optical fiber 37, respectively. Moreover, a fusion splice point between the first optical fiber 31 and the second optical fiber 32 is referred to as P2, a fusion splice point between the second optical fiber 32 and the third optical fiber 33 is referred to as P3, a fusion splice point between the third optical fiber 33 and the fourth optical fiber 34 is referred to as P4, a fusion splice point between the fourth optical fiber 34 and the fifth optical fiber 35 is referred to as P5, a fusion splice point between the fifth optical fiber 35 and the sixth optical fiber 36 is referred to as P6, and a fusion splice point between the sixth optical fiber 36 and the seventh optical fiber 37 is referred to as P7.

In the fiber laser 3, a fiber bragg grating 32x (serving as a high reflective mirror) is inserted in the second optical fiber 32 and a fiber bragg grating 36x (serving as a low reflective mirror) is inserted in the sixth optical fiber 36. A section (including the fourth optical fiber 34 serving as an amplification fiber) between the fiber bragg grating 32x and the fiber bragg grating 36x constitutes a Fabry-Perot resonator. Regarding signal light oscillated by this Fabry-Perot resonator, most of this signal light is transmitted toward an emission point P8 after transmitted through the fiber bragg grating 36x. However, part of the signal light is transmitted toward an end point P1 after transmitted through the fiber bragg grating 32x. The latter signal light (hereinafter, also referred to as "backward-travelling signal light") transmitted toward the end point P1 has a lower strength than the former signal light (hereinafter, also referred to as "forward-travelling signal light") transmitted toward the emission point P8. However, when the fiber laser 3 is arranged be a higher-power fiber laser, heat generated by the backward-travelling signal light becomes unignorable. Accordingly, the present invention is applied to Third Embodiment, so that heat dissipating places are dispersed for the forward-travelling light transmitted toward the emission point P8 and the backward-travelling signal light transmitted toward the end point P1. The same applies to heat dissipation of the residual excitation light.

The first optical fiber 31 is made of a single clad fiber. This first optical fiber is utilized for transmitting the backward-travelling signal light amplified by the fourth optical fiber 34. After the backward-travelling signal light enters the first optical fiber 31 from the second optical fiber 32 via the fusion splice point P2 and then propagates through the first optical fiber 31, this backward-travelling signal light is outputted to the outside from the end point P1.

The second optical fiber 32 is made of a triple clad fiber. This second optical fiber 32 is utilized, together with the first optical fiber 31, for transmitting the backward-travelling signal light amplified by the fourth optical fiber 34. In the second optical fiber 32, the fiber bragg grating 32x serving as a high reflective mirror is inserted. Part of the backward-travelling signal light having entered a core of the second optical fiber 32 from the third optical fiber 33 via the fusion splice point P3 is transmitted through the fiber bragg grating 32x. Then, this part of the backward-travelling signal light enters the first optical fiber 31 via the fusion splice point P2. Meanwhile, the rest of the backward-travelling signal light having entered the core of the second optical fiber 32 from the third optical fiber 33 via the fusion splice point P3 is reflected by the fiber bragg grating 32x. Then, this backward-travelling signal light reflected by the fiber bragg grating 32x enters the third optical fiber 33 via the fusion splice point P3.

The third optical fiber 33 is made of a triple clad fiber. This third optical fiber 33 is utilized, together with the first optical fiber 31 and the second optical fiber 32, for transmitting the backward-travelling signal light amplified by the fourth optical fiber 34. The backward-travelling signal light having entered the third optical fiber 33 from the fourth optical fiber 34 via the fusion splice point P4 propagates through a core of the third optical fiber 33. Then, this backward-travelling signal light enters the second optical fiber 32 via the fusion splice point P3. In the third optical fiber 33, a pump combiner 33x connected with at least one (six in an example illustrated in FIG. 9) excitation light source 33y is inserted. After excitation light enters the third optical fiber 33 from the excitation light source 33y via the pump combiner 33x and then propagates through the third optical fiber 33, this excitation light enters the fourth optical fiber 34 via the fusion splice point P4.

The fourth optical fiber 34 is made of a double clad fiber. This fourth optical fiber 34 has a core 34a (see FIG. 10) to which an active element such as rare earth is added. After the excitation light having entered the fourth optical fiber 34 from the third optical fiber 33 via the fusion splice point P4 propagates through a first clad 34b1 (see FIG. 10) of the fourth optical fiber 34, the excitation light enters the fifth optical fiber 35 via the fusion splice point P5. This excitation light causes a transition of the active element added to the core 35a to a state of population inversion. After the transition of the active element into the state of population inversion has occurred, the active element causes chain stimulated emission due to naturally emitted light. In other words, in the fourth optical fiber 34, part of naturally emitted light becomes signal light. Then, this signal light is amplified while propagating through the core 34a of the fourth optical fiber 34.

The fifth optical fiber 35 is made of a triple clad fiber. This fifth optical fiber 35 is utilized for transmitting the forward-travelling signal light amplified by the fourth optical fiber 34. After the forward-travelling signal light enters the fifth optical fiber 35 from the fourth optical fiber 34 via the fusion splice point P5 and then propagates through a core 35a (see FIG. 10) of the fifth optical fiber 35, this forward-travelling signal light enters the sixth optical fiber 36 via the fusion splice point P6. In the fifth optical fiber 35, a pump combiner 35x connected with at least one (six in the example illustrated in FIG. 9) excitation light source 35y is inserted. After excitation light enters the fifth optical fiber 35 from the excitation light source 35y via the pump combiner 35x and then propagates through the fifth optical fiber 35, this excitation light enters the fourth optical fiber 34 from an opposite side via the fusion splice point P5. Note that a state of propagation of clad mode signal light and residual excitation light will be discussed later, with reference to different drawings.

The sixth optical fiber 36 is made of a triple clad fiber. This sixth optical fiber 36 is utilized, together with the fifth optical fiber 35, for transmitting the forward-travelling signal light amplified by the fourth optical fiber 34. In the sixth optical fiber 36, the fiber bragg grating 36x serving as a low reflective mirror is inserted. Accordingly, after part of the forward-travelling signal light having entered a core 36a (see FIG. 11) of the sixth optical fiber 36 from the fifth optical fiber 35 via the fusion splice point P6 and then propagates through the fiber bragg grating 36x, this part of the forward-travelling signal light enters the seventh optical fiber 37 via the fusion splice point P7. Meanwhile, the rest of the forward-travelling signal light having entered the core 36a of the sixth optical fiber 36 from the fifth optical fiber 35 via the fusion splice point P6 is reflected by the fiber bragg grating 36x. Then, this forward-travelling signal light reflected by the fiber bragg grating 36x enters the fifth optical fiber 35 from an opposite side via the fusion splice point P6. Note that a state of propagation of clad mode signal light and residual excitation light will be discussed later, with reference to different drawings.

The seventh optical fiber 37 is made of a single clad fiber. This seventh optical fiber 37 is utilized, together with the fifth optical fiber 35 and the sixth optical fiber 36, for transmitting the forward-travelling signal light amplified by the fourth optical fiber 34. After the forward-travelling signal light having entered the seventh optical fiber 37 from the sixth optical fiber 36 via the fusion splice point P7 propagates through a core 37a (see FIG. 12) of the seventh optical fiber 37, the forward-travelling signal light is outputted to the outside from the emission point P8. Note that a state of propagation of clad mode signal light and residual excitation light will be discussed later, with reference to different drawings.

Note that the fusion splice points P6, P7, P3, and P2 are provided with heat dissipating sections 38, 39, 40, and 41, respectively. Each of respective configurations of these heat dissipating sections 38 to 41 is similar to that of a heat dissipating section 18 illustrated in FIG. 2. Functions of these heat dissipating sections 38 to 41 will be discussed later with reference to different drawings.

[State of Propagation of Signal Light and Excitation Light]

Next, the following discusses a state of propagation of signal light and excitation light, with reference to FIGS. 10 through 12. Note that although the following discusses forward-travelling signal light and forward-travelling excitation light that propagate toward the emission point P8 from the fourth optical fiber 34, the same applies to backward-travelling signal light and backward-travelling excitation light that propagate toward the end point P1 from the fourth optical fiber 34.

FIG. 10 is a schematic view illustrating a state of propagation of signal light and excitation light in the vicinity of the fusion splice point P5 between the fourth optical fiber 34 and the fifth optical fiber 35. (a) of FIG. 10 is relevant to signal light, while (b) of FIG. 10 is relevant to excitation light.

The fourth optical fiber 34 is made of a double clad fiber. The fourth optical fiber 34 has a transverse cross section having a four-layer structure that includes (1) the core 34a, (2) the first clad 34b1 surrounding the core 34a, (3) a second clad 34b2 surrounding the first clad 34b1, and (4) a jacket 34c surrounding the second clad 34b2, as illustrated in FIG. 10. The core 34a and the first clad 34b1 are made of glass and the second clad 34b2 and the jacket 34c are made of resin (e.g., polymer resin). In the vicinity of the fusion splice point P5, the second clad 34b2 and the jacket 34c made of resin are removed and the first clad 34b1 made of glass is exposed.

Meanwhile, the fifth optical fiber 35 is made of a triple clad fiber. The fifth optical fiber 35 has a transverse cross section having a five-layer structure that includes (1) the core 35a, (2) a first clad 35b1 surrounding the core 35a, (3) a second clad 35b2 surrounding the first clad 35b1, (4) a third clad 35b3 surrounding the second clad 35b2, and (5) a jacket 35c surrounding the third clad 35b3, as illustrated in FIG. 10. The core 35a, the first clad 35b1, and the second clad 35b2 are made of glass and the third clad 35b3 and the jacket 35c are made of resin (e.g., polymer resin). In the vicinity of the fusion splice point P5, the third clad 35b3 and the jacket 35c made of resin are removed and the second clad 35b2 made of glass is exposed.

As illustrated in (a) of FIG. 10, in a case where axis misalignment occurs between the fourth optical fiber 34 and the fifth optical fiber 35, part (La1) of signal light La1, La2 having propagated through the core 34a of the fourth optical fiber 34 enters the core 35a of the fifth optical fiber 35 and the rest (La2) of the signal light La1, La2 enters the first clad 35b1 of the fifth optical fiber 35. In this way, none of the signal light La1, La2 enters the second clad 35b2 of the fifth optical fiber 35. This is because at the fusion splice point P5, a transverse cross section of the core 34a of the fourth optical fiber 34 is contained in a transverse cross section of a region consisting of the core 35a and the first clad 35b1 of the fifth optical fiber 35.

The signal light La1 having entered the core 3a of the fifth optical fiber 35 becomes core mode signal light that propagates through the core 35a of the fifth optical fiber 35. Meanwhile, the signal light La2 having entered the first clad 35b1 of the fifth optical fiber 35 becomes clad mode signal light that propagates through the first clad 35b1 of the fifth optical fiber 35.

Meanwhile, as illustrated in (b) of FIG. 10, after residual excitation light Lb1, Lb2 propagates through the first clad 34b1 of the fourth optical fiber 34, part (Lb1) of the residual excitation light Lb1, Lb2 enters the first clad 35b1 of the fifth optical fiber 35 and the rest (Lb2) of the residual excitation light Lb1, Lb2 enters the second clad 35b2 of the fifth optical fiber 35. As described above, the residual excitation light Lb1, Lb2 enters both the first clad 35b1 and the second clad 35b2 of the fifth optical fiber 35. This is because at the fusion splice point P5, the first clad 34b1 of the fourth optical fiber 34 has a transverse cross section that overlaps with (coincides in part with) a transverse cross section of both the first clad 35b1 and the second clad 35b2 of the fifth optical fiber 35.

The residual excitation light Lb1 having entered the first clad 35b1 of the fifth optical fiber 35 propagates through the first clad 35b1 of the fifth optical fiber 35. Meanwhile, the residual excitation light Lb2 having entered the second clad 35b2 of the fifth optical fiber 35 propagates through the second clad 35b2 of the fifth optical fiber 35. Here, the residual excitation light Lb2 having entered the second clad 35b2 of the fifth optical fiber 35 does not leak out of the fifth optical fiber 35. This is because the fusion splice point P5 is not embedded in a high refractive index resin but the fusion splice point P5 is surrounded by the air whose refractive index is lower than that of the second clad 35b2 of the fifth optical fiber 35. Moreover, the fusion splice point P5 is not embedded in high refractive index resin because excitation light enters the second clad 35b2 of the fifth optical fiber 35 from the excitation light source 35y via the pump combiner 35x. If the fusion splice point P5 were embedded in high refractive index resin, this excitation light would leak out.

Note that the same applies to a state of propagation of signal light and excitation light in the vicinity of the fusion splice point P4 between the fourth optical fiber 34 and the third optical fiber 33, except that a propagation direction is reversed.

FIG. 11 is a schematic view illustrating a state of propagation of signal light and excitation light in the vicinity of the fusion splice point P6 between the fifth optical fiber 35 and the sixth optical fiber 36. (a) of FIG. 11 is relevant to signal light, while (b) of FIG. 11 is relevant to excitation light.

The sixth optical fiber 36 is made of a triple clad fiber. The sixth optical fiber 36 has a transverse cross section having a five-layer structure that includes (1) the core 36a, (2) a first clad 36b1 surrounding the core 36a, (3) a second clad 36b2 surrounding the first clad 36b1, (4) a third clad 36b3 surrounding the second clad 36b2, and (5) a jacket 36c surrounding the third clad 36b2, as illustrated in FIG. 11. The core 36a, the first clad 36b1 and the second clad 36b2 are made of glass, and the third clad 36b2 and the jacket 36c are made of resin (e.g., polymer resin). In the vicinity of the fusion splice point P5, the third clad 36b3 and the jacket 36c made of resin are removed and the second clad 36b2 made of glass is exposed. A core diameter, a first clad diameter, and a second clad diameter of the sixth optical fiber 36 are the same as a core diameter, a first clad diameter, and a same second clad diameter of the fifth optical fiber 35, respectively.

After core mode signal light La1 propagates through the core 35a of the fifth optical fiber 35, the core mode signal light La1 directly enters the core 36a of the sixth optical fiber 36, as illustrated in (a) of FIG. 11. This is because the core diameter of the fifth optical fiber 35 is the same as the core diameter of the sixth optical fiber 36. Further, after clad mode signal light La2 propagates through the first clad 35b1 of the fifth optical fiber 35, the clad mode signal light La2 directly enters the first clad 36b1 of the sixth optical fiber 36, as illustrated in (a) of FIG. 11. This is because the first clad diameter of the fifth optical fiber 35 is the same as the first clad diameter of the sixth optical fiber 36. In this way, the signal light La1, La2 having propagated through the fifth optical fiber 35 does not leak out of the sixth optical fiber 36 but propagates through the sixth optical fiber 36.

Note that in a case where axial misalignment occurs between the fifth optical fiber 35 and the sixth optical fiber 36, the core mode signal light La1 having propagated through the core 35a of the fifth optical fiber 35 also enters the first clad 36b1 of the sixth optical fiber 36. However, even in this case, the core mode signal light La1 having propagated through the core 35a of the fifth optical fiber 35 does not enter the second clad 36b2 of the sixth optical fiber 36. This is because the transverse cross section of the core 35a of the fifth optical fiber 35 is contained in a transverse cross section of a region consisting of the core 36a and the first clad 36b1 of the sixth optical fiber 36 so as to have a sufficient margin space from the region. Accordingly, even in a case where axial misalignment occurs between the fifth optical fiber 35 and the sixth optical fiber 36, the core mode signal light La1 having propagated through the core 35a of the fifth optical fiber 35 does not leak out of the sixth optical fiber 36 in the vicinity of the fusion splice point P6.

Meanwhile, in a case where axial misalignment occurs between the fifth optical fiber 35 and the sixth optical fiber 36, the clad mode signal light La2 having propagated through the first clad 35b1 of the fifth optical fiber 35 also enters the second clad 36b2 of the sixth optical fiber 36. Accordingly, in this case, the clad mode signal light La2 having propagated through the first clad 35b1 of the fifth optical fiber 35 may leak out of the sixth optical fiber 36 in the vicinity of the fusion splice point P6. In the case of a high output fiber, heat generated due to this leakage may cause a problem. However, such leakage can be avoided by employing a configuration where the first clad diameter of the sixth optical fiber 36 is arranged to be larger than the first clad diameter of the fifth optical fiber 35. In other words, such leakage can be avoided by employing a configuration where at the fusion splice point P6, the transverse cross section of the first clad 35b1 of the fifth optical fiber 35 is contained in the transverse cross section of the region consisting of the core 36a and the first clad 36b1 of the sixth optical fiber 36 so as to have a sufficient margin space from the region.

After the residual excitation light Lb1 propagates through the first clad 35b1 of the fifth optical fiber 35, this residual excitation light Lb1 directly enters the first clad 36b1 of the sixth optical fiber 36, as illustrated in (b) of FIG. 11. This is because the first clad diameter of the fifth optical fiber 35 is the same as the first clad diameter of the sixth optical fiber 36. Further, after the residual excitation light Lb2 propagates through the second clad 35b2 of the fifth optical fiber 35, the residual excitation light Lb2 directly enters the second clad 36b2 of the sixth optical fiber 36, as illustrated in (b) of FIG. 11. This is because the second clad diameter of the fifth optical fiber 35 is the same as the second clad diameter of the sixth optical fiber 36. The residual excitation light Lb2 having entered the second clad 36b2 of the sixth optical fiber 36 leaks out into a high refractive index resin 38b whose refractive index is higher than that of the second clad 36b2 of the sixth optical fiber 36. Then, the residual excitation light Lb2 is converted into heat by a metal plate that constitutes, together with the high refractive index resin 38b, a heat dissipating section 38.

Note that the same applies to a state of propagation of signal light and excitation light in the vicinity of the fusion splice point P3 between the third optical fiber 33 and the second optical fiber 32, except that a propagation direction is reversed.

FIG. 12 is a schematic view illustrating a state of propagation of signal light and excitation light in the vicinity of the fusion splice point P7 between the sixth optical fiber 36 and the seventh optical fiber 37. (a) of FIG. 12 is relevant to signal light, while (b) of FIG. 12 is relevant to excitation light.

The seventh optical fiber 37 is made of a single clad fiber and has a three-layer structure that includes (1) the core 37a, (2) a clad 37b surrounding the core 37a, and (3) a jacket 37c surrounding the clad 37b. The core 37a and the clad 37b are made of glass, and the jacket 37c is made of resin (i.e., polymer resin). In the vicinity of the fusion splice point P7, the jacket 37c made of resin is removed and the clad 37b is exposed.

After the core mode signal light La1 propagates through the core 36a of the sixth optical fiber 36, the core mode signal light La1 enters the core 37a of the seventh optical fiber 37, as illustrated in (a) of FIG. 12. In other words, the core mode signal light La1 having propagated through the core 36a of the sixth optical fiber 36 neither enters the clad 37b of the seventh optical fiber 37 nor leaks out of the seventh optical fiber 37 in the vicinity of the fusion splice point P7. This is because at the fusion splice point P7, the core 36a of the sixth optical fiber 36 is contained in the core 37a of the seventh optical fiber 37 and the core 36a of the sixth optical fiber 36 does not overlap with the clad 37b of the seventh optical fiber 37.

Meanwhile, after the clad mode signal light La2 propagates through the first clad 36b1 of the sixth optical fiber 36, the clad mode signal light La2 enters the clad 37b of the seventh optical fiber 37, as illustrated in (a) of FIG. 12. Then, the clad mode signal light La2 having entered the clad 37b of the seventh optical fiber 37 leaks out into a high refractive index resin 39b whose refractive index is higher than that of the clad 37b of the seventh optical fiber 37. Thereafter, the clad mode signal light La2 is converted into heat by a metal plate that constitutes, together with the high refractive index resin 39b, a heat dissipating section 39.

Similarly, after the residual excitation light Lb1 propagates through the first clad 36b1 of the sixth optical fiber 36, the residual excitation light Lb1 enters the clad 37b of the seventh optical fiber 37, as illustrated in (b) of FIG. 12. Then, the residual excitation light Lb1 having entered the clad 37b of the seventh optical fiber 37 leaks out into the high refractive index resin 39b whose refractive index is higher than that of the clad 37b of the seventh optical fiber 37. Thereafter, the residual excitation light Lb1 is converted into heat by the metal plate that constitutes, together with the high refractive index resin 39b, a heat dissipating section 39.

Note that in a case where a contact between the core 36a of the sixth optical fiber 36 and the clad 37b of the seventh optical fiber 37 exists due to axial misalignment, part of the core mode signal light La1 having propagated through the core 36a of the sixth optical fiber 36 enters the clad 37b of the seventh optical fiber 37. In this case, the core mode signal light La1 having entered the clad 37b of the seventh optical fiber 37 leaks out of the seventh optical fiber 37 into the high refractive index resin 39b in a similar manner as the clad mode signal light La2 and the residual excitation light Lb1 that have entered the clad 37b of the seventh optical fiber 37. Thereafter, this residual excitation light Lb1 is converted into heat by the metal plate that constitutes, together with the high refractive index resin 39b, the heat dissipating section 39.

Note that the same applies to a state of propagation of signal light and excitation light in the vicinity of the fusion splice point P2 between the second optical fiber 32 and the first optical fiber 31, except that a propagation direction is reversed.

As described above, in the fiber laser 3 of Third embodiment, part of the residual excitation light is converted into heat in the heat dissipating section 38 and the heat dissipating section 40, and the clad mode signal light and the rest of the residual excitation light are converted into heat in the heat dissipating section 39 and the heat dissipating section 41. This makes it possible to suppress a quantity of heat generated in each of the four heat dissipating sections 38 through 41 to a lower quantity, as compared to a configuration where the residual excitation light and the clad mode signal light are converted into heat in a single heat dissipating section.

CONCLUSION

As described above, a fiber-optic system according to each of the above-described embodiments includes: a double clad fiber for amplifying light; and a single clad fiber for transmitting the light amplified by the double clad fiber, wherein a triple clad fiber is inserted between the double clad fiber and the single clad fiber.

In the above configuration, part of light (e.g., signal light) amplified by the double clad fiber and light (e.g., excitation light) utilized for amplifying the light (e.g., signal light) by the double clad fiber can be caused to enter a first clad of the triple clad fiber. Even in a case where a third clad of the triple clad fiber is removed in the vicinity of a splice point between the double clad fiber and the triple clad fiber, the light having entered the first clad of the triple clad fiber does not leak out of the triple clad fiber but propagates through the first clad of the triple clad fiber. Then, the light having propagated through the first clad of the triple clad fiber enters the single clad fiber. In other words, in the above configuration, leakage of all the light having entered the triple clad fiber can be avoided in the vicinity of the splice point between the double clad fiber and the triple clad fiber. Accordingly, it becomes possible to scatter positions where light leakage occurs in the fiber-optic system and thereby suppress a quantity of heat generated at each of such positions to a low quantity. This makes it possible to provide a fiber-optic system having a higher reliability as compared to a conventional fiber-optic system.

In the above fiber-optic system, preferably, at the splice point between the double clad fiber and the triple clad fiber, a cross section of a core of the double clad fiber is contained in a cross section of a region consisting of a core and a first clad of the triple clad fiber. Here, the "cross section" means a cross section (e.g., a transverse cross section) that becomes a boundary plane between the double clad fiber and the triple clad fiber.

In the above configuration, light having propagated through the core of the double clad fiber can be caused to enter either the core or the first clad of the triple clad fiber. Accordingly, leakage of the light having entered the triple clad fiber from the core of the double clad fiber can be avoided in the vicinity of the splice point between the double clad fiber and the triple clad fiber.

In the above fiber-optic system, preferably, at the splice point between the double clad fiber and the triple clad fiber, a cross section of a/the first clad of the double clad fiber overlaps with cross sections of both of the first clad and a second clad of the triple clad fiber. Here, the "cross section" means a cross section (e.g., a transverse cross section) that becomes a boundary plane between the double clad fiber and the triple clad fiber.

In the above configuration, light having propagated through the first clad of the double clad fiber can be caused to enter both of the first clad and the second clad of the triple clad fiber. The light having entered the first clad of the triple clad fiber does not leak out of the triple clad fiber, in the vicinity of the splice point between the double clad fiber and the triple clad fiber, but propagates through the first clad of the triple clad fiber. Then, the light having propagated through the first clad of the triple clad fiber enters the single clad fiber. Meanwhile, the light having entered the second clad of the triple clad fiber leaks out of the triple clad fiber in the vicinity of the splice point between the double clad fiber and the triple clad fiber. Accordingly, in the above configuration, light having propagated through the first clad of the double clad fiber can be caused to leak out in a dispersed manner at the splice point between the double clad fiber and the triple clad fiber and a splice point between the triple clad fiber and the single clad fiber. Note that the above configuration is effective particularly in a case where high-power excitation light propagates through the first clad of the double clad fiber.

In the above fiber-optic system, preferably, at the splice point between the triple clad fiber and the single clad fiber, a cross section of the first clad of the triple clad fiber overlaps with a cross section of a clad of the single clad fiber. Here, the "cross section" means a cross section (e.g., a transverse cross section) that becomes a boundary plane between the double clad fiber and the single clad fiber.

In the above configuration, light having propagated through the first clad of the triple clad fiber can be caused to enter the clad of the single clad fiber. The light having entered the clad of the single clad fiber leaks out of the single clad fiber in the vicinity of the splice point between the triple clad fiber and the single clad fiber. Accordingly, in the above configuration, light having propagated through the first clad of the triple fiber can be caused to leak out of the single clad fiber in the vicinity of the triple clad fiber and the single clad fiber. Note that the above configuration is effective particularly in a case where light (e.g., signal light) amplified by the double clad fiber propagates through the first clad of the triple clad fiber. This is because the light having propagated through the first clad of the triple clad fiber may deteriorate quality (e.g., signal quality) of light having propagated through the core of the triple clad fiber and therefore, it is preferably to remove such light prior to output of light from an output end of the signal clad fiber.

In the above fiber-optic system, preferably, a plurality of triple clad fiber elements whose first clads have different cross sectional areas, respectively, are inserted between the double clad fiber and the single clad fiber; and the plurality of triple clad fiber elements are joined so that a cross section of a first clad of each one of the plurality of triple clad fiber elements overlaps with cross sections of both of a first clad and a second clad of another one of the plurality of triple clad fiber elements, the another one of the plurality of triple clad fiber elements being joined to the each one of the plurality of the triple clad fiber elements, on a side opposite to a side where the double clad fiber is joined to the triple clad fiber. Here, the "cross section" means a cross section (e.g., a transverse cross section) that becomes a boundary plane between the triple clad fiber elements.

In the above configuration, it is possible to remove, in a stepwise manner, light having entered a triple clad fiber element that is the closest to the double clad fiber among the plurality of triple clad fiber elements, at each splice point between the plurality of triple clad fiber elements.

The above fiber-optic system can constitute, for example, a fiber amplifier or a fiber laser. Such a device like the fiber amplifier or the fiber laser has a higher reliability as compared to a conventional one.

A method according to each of the above-described embodiments for producing a fiber-optic system, includes the step of inserting a triple clad fiber between a double clad fiber for amplifying light and a single clad fiber for transmitting light amplified by the double clad fiber.

The above configuration makes it possible to produce a fiber-optic system having a higher reliability as compared to a conventional fiber-optic system.

Preferably, the above method for producing a fiber-optic system further includes the step of setting a ratio of a cross sectional area of a first clad of the triple clad fiber and a cross sectional area of a second clad of the triple clad fiber in accordance with a permissible quantity of heat generated at a splice point between the double clad fiber and the triple clad fiber and a permissible quantity of heat generated at a splice point between the triple clad fiber and the single clad fiber.

The above configuration makes it possible to easily suppress a quantity of heat generated at the splice point between the double clad fiber and the triple clad fiber and a quantity of heat generated at the splice point between the triple clad fiber and the single clad fiber, to a quantity equal to or lower than a permissible quantity.

<Additional Matters>

The present invention is not limited to the description of the embodiments above, but may be altered by a skilled person within the scope of the claims. That is, an embodiment based on a proper combination of technical means disclosed in different embodiments is encompassed in the technical scope of the present invention. For example, in the above embodiments, an outer periphery of each of core and clad layers is configured to be circular. However, the present invention is not limited to this configuration. In other words, the technical scope of the present invention obviously encompasses an embodiment where each of the core and clad layers has, for example, a polygonal shape that is not circular.

INDUSTRIAL APPLICABILITY

The present invention can be widely applied to fiber-optic systems, such as a fiber amplifier and a fiber laser, each including an amplification double clad fiber and a transmission single clad fiber.

REFERENCE SIGNS LIST 1 fiber amplifier
11 first optical fiber
12 second optical fiber
13 third optical fiber (double clad fiber)
14 fourth optical fiber (triple clad fiber)
15 fifth optical fiber (single clad fiber)
16 excitation light source
17 pump combiner
18 heat dissipating section
19 heat dissipating section
2 fiber laser (forward pumping)
21 first optical fiber
22 second optical fiber
23 third optical fiber (double clad fiber)
24 fourth optical fiber (triple clad fiber)
25 fifth optical fiber (single clad fiber)
26 excitation light source
27 pump combiner
28 heat dissipating section
29 heat dissipating section
20a fiber bragg grating
20b fiber bragg grating
3 fiber amplifier (bidirectional pumping)
31 first optical fiber (single clad fiber)
32 second optical fiber (triple clad fiber)
33 third optical fiber (triple clad fiber)
34 fourth optical fiber (double clad fiber)
35 fifth optical fiber (triple clad fiber)
36 sixth optical fiber (triple clad fiber)
37 seventh optical fiber (single clad fiber)
38 through 41 heat dissipating sections
33x, 35x pump combiners
33y, 35y excitation light sources
32x, 36x fiber bragg gratings

The invention claimed is:

1. A fiber-optic system comprising:
    a double clad fiber for amplifying light, the double clad fiber having a core, a first clad and a second clad;
    a single clad fiber for transmitting the light amplified by the double clad fiber, the single clad fiber having a core and a first clad; and
    a triple clad fiber inserted between the double clad fiber and the single clad fiber, the triple clad fiber including a core, a first clad, a second clad and a third clad,
    the triple clad fiber including a plurality of triple clad fiber elements whose first clads have different cross sectional areas, respectively,
    the plurality of triple clad fiber elements being joined so that a cross section of a first clad of each one of the plurality of triple clad fiber elements except a triple clad fiber element farthest from the double clad fiber overlaps with cross sections of both of a first clad and a second clad of another one of the plurality of triple clad fiber elements, the another one of the plurality of triple clad fiber elements being joined to the each one of the plurality of the triple clad fiber elements, on a side opposite to a side where the double clad fiber is joined to the triple clad fiber.

2. The fiber-optic system as set forth in claim 1, wherein at a splice point between the double clad fiber and the triple clad fiber, a cross section of the core of the double clad fiber is contained in a cross section of a region consisting of the core and the first clad of the triple clad fiber.

3. The fiber-optic system as set forth in claim 1, wherein at the splice point between the double clad fiber and the triple clad fiber, a cross section of the first clad of the double clad fiber overlaps with cross sections of both of the first clad and the second clad of the triple clad fiber.

4. The fiber-optic system as set forth in claim 1, wherein at a splice point between the triple clad fiber and the single clad fiber, a cross section of the first clad of the triple clad fiber overlaps with a cross section of the clad of the single clad fiber.

5. The fiber-optic system as set forth in claim 1, wherein the fiber-optic system constitutes a fiber amplifier.

6. The fiber-optic system as set forth in claim 1, wherein the fiber-optic system constitutes a fiber laser.

7. A method for producing a fiber-optic system, the method comprising the steps of:
    joining, to one end of a triple clad fiber, a double clad fiber for amplifying light;
    joining, to the other end of the triple clad fiber, a single clad fiber for transmitting light amplified by the double clad fiber; and
    setting a ratio of a cross sectional area of a first clad of the triple clad fiber and a cross sectional area of a second clad of the triple clad fiber in accordance with a permissible quantity of heat generated at a splice point between the double clad fiber and the triple clad fiber and a permissible quantity of heat generated at a splice point between the triple clad fiber and the single clad fiber.

* * * * *